(12) United States Patent
Nomura

(10) Patent No.: US 6,298,024 B1
(45) Date of Patent: Oct. 2, 2001

(54) DEVICE FOR IDENTIFYING OPTICAL DISC TYPE BASED ON DENSITY OF RADIAL INFORMATION TRACKS THEREON

(75) Inventor: Masaru Nomura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/208,934

(22) Filed: Dec. 10, 1998

(30) Foreign Application Priority Data

Dec. 15, 1997 (JP) ........................................... 9-343529

(51) Int. Cl.⁷ ........................................... G11B 5/09
(52) U.S. Cl. ........................ 369/53.22; 369/124.15
(58) Field of Search ........................ 369/44.25, 44.27, 369/44.28, 44.29, 53.2, 53.22, 53.23, 44.13, 44.35, 44.36, 47.37, 47.5, 47.55, 53.37, 124.11, 124.12, 124.15

(56) References Cited

U.S. PATENT DOCUMENTS 5,684,773   11/1997   Hayashi .

FOREIGN PATENT DOCUMENTS

| 0 453 995 A2 | 10/1991 | (EP) . |
| 0 520 461 A2 | 12/1992 | (EP) . |
| 0 526 250 A2 | 2/1993  | (EP) . |
| 0 881 638 A1 | 12/1998 | (EP) . |
| 03207056     | 9/1991  | (JP) . |
| 09270167     | 10/1997 | (JP) . |

Primary Examiner—Paul W. Huber
(74) Attorney, Agent, or Firm—Dike bronstein Roberts & Cushman IP Group; David G. Conlin; David A. Tucker

(57) ABSTRACT

A controller instructs a spindle motor to start rotating, and instructs a servo control section to start a focus servo control. When a light beam crosses information tracks on an optical disc with a rotation of the optical disc, an amplitude indicating signal generating section detects changes in the amplitude of a readout signal output from an optical pickup. A disc type identifying section identifies types of optical discs having different track pitches of the information tracks in starting the rotation of each optical disc based on the peak value and bottom value or the amplitude of the readout signal. Consequently, the types of optical discs having different information recording densities, particularly different track pitches, can be identified at an early stage without waiting for reproduction of information recorded on each optical disc. It is therefore possible to shorten the time for starting an optical disc device, or prevent an increase in the starting time.

40 Claims, 14 Drawing Sheets

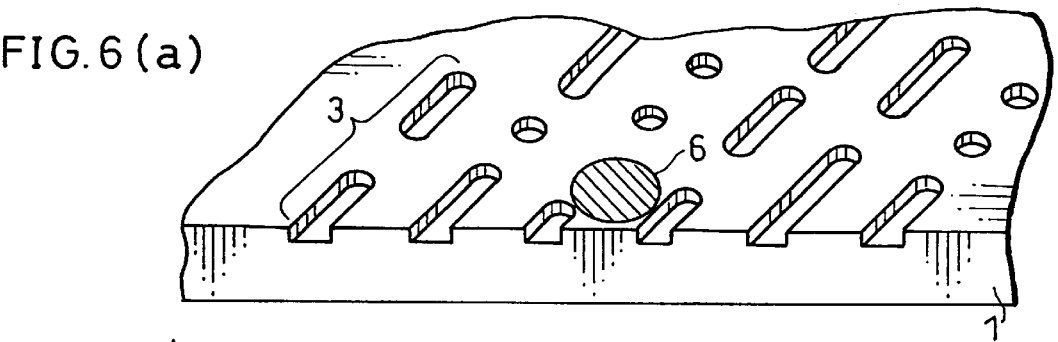
FIG. 6(a)
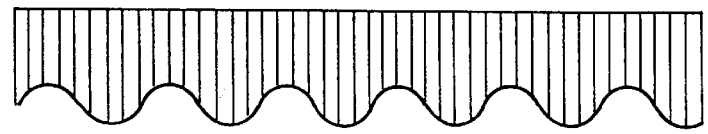
FIG. 6(b) RF
FIG. 6(c) RFAMP
FIG. 7
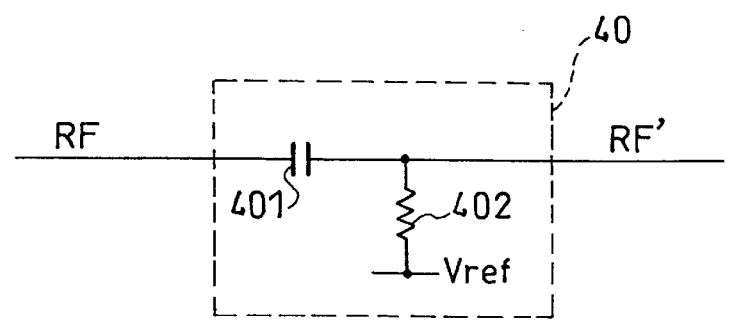

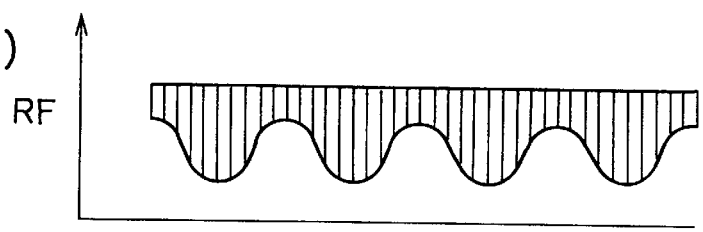
FIG.8(a)
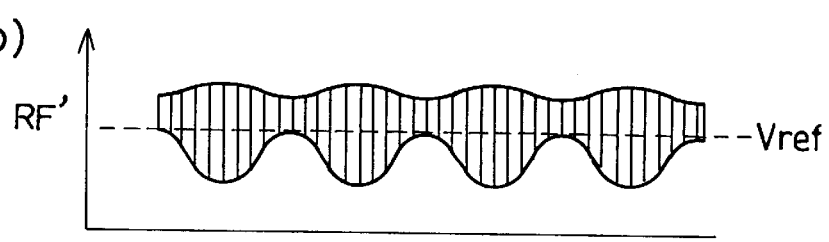
FIG.8(b)
FIG.9
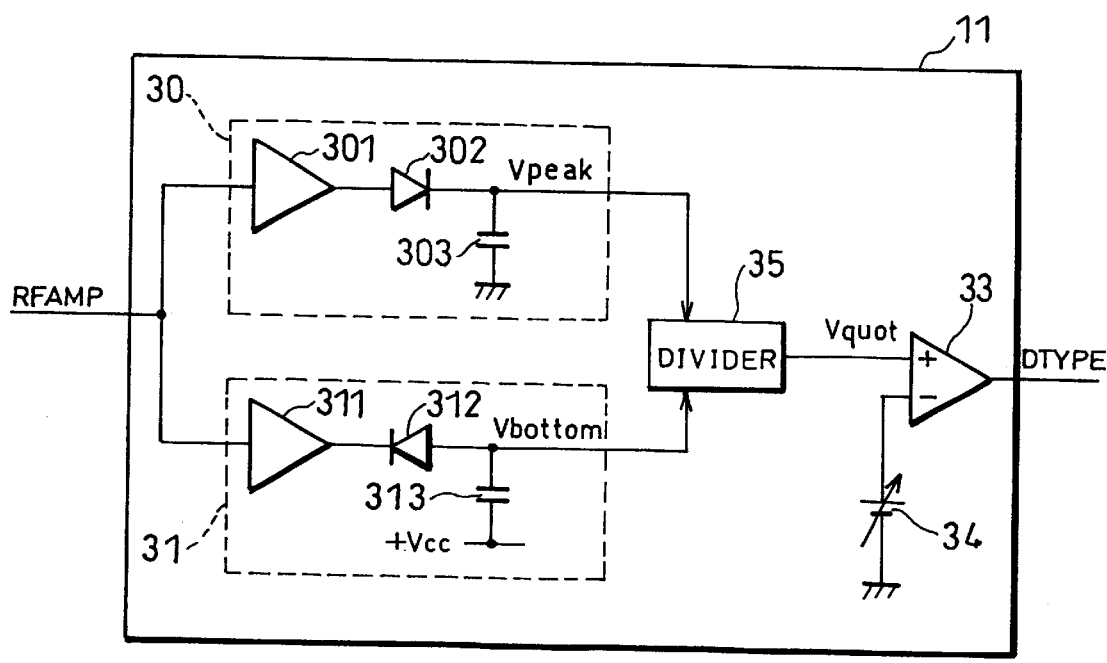

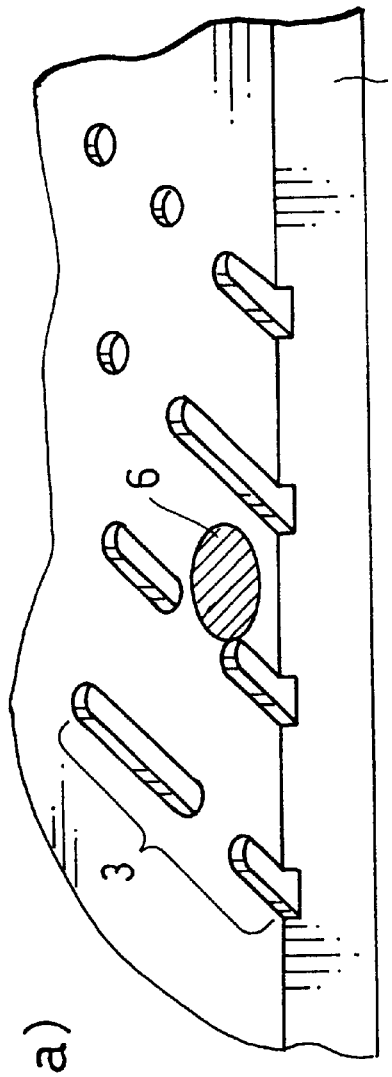
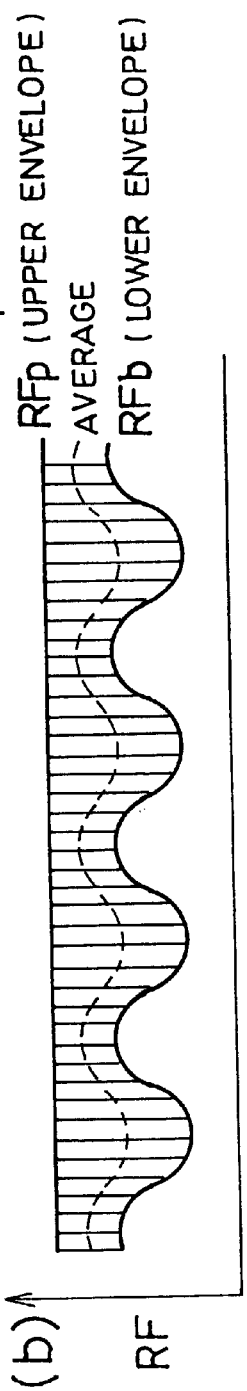
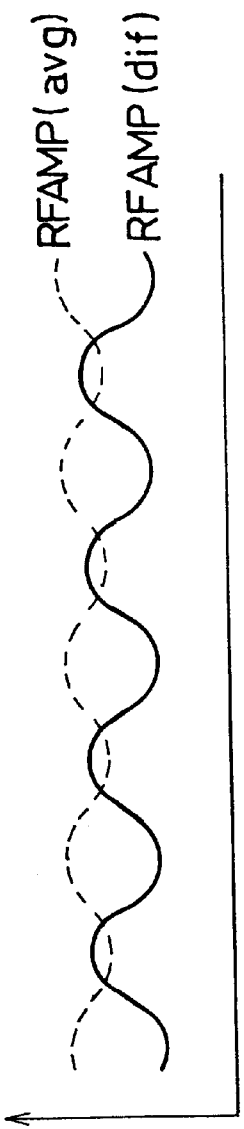
FIG.12(a)
FIG.12(b) RF
FIG.12(c) RFAMP

RF

RFAMP

RF

VAGC

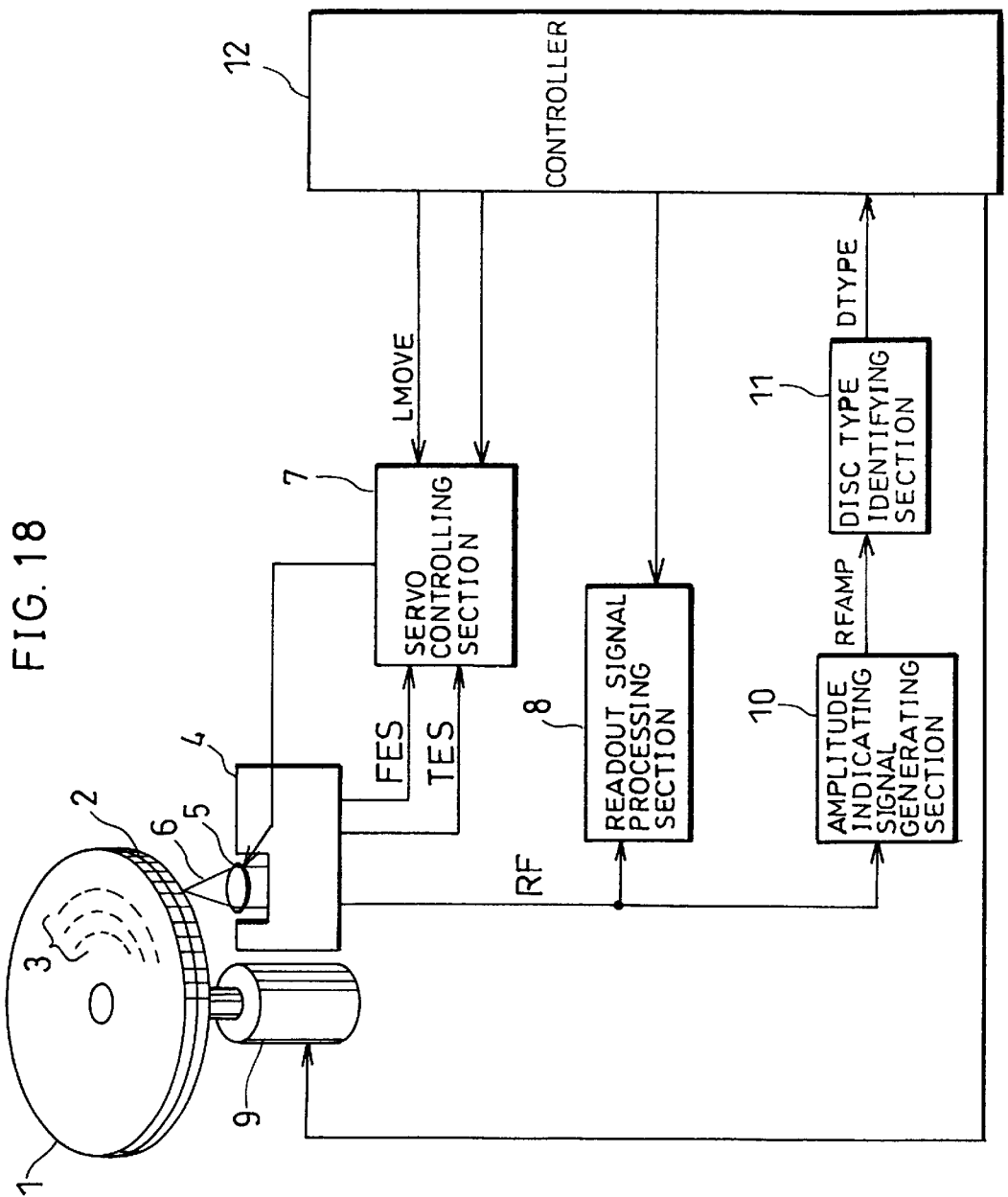

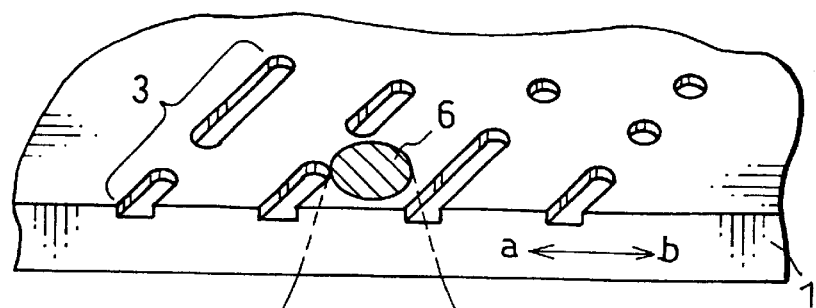
FIG.21(a)
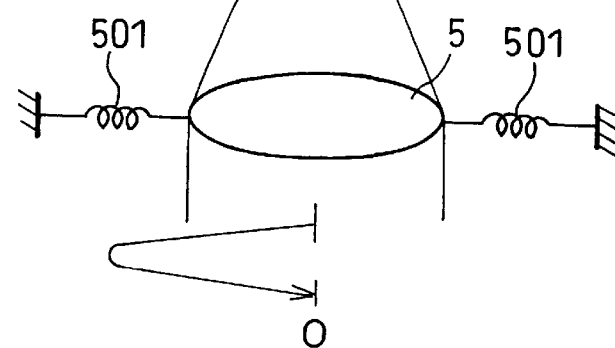
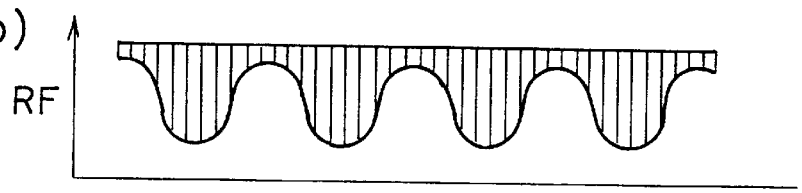
FIG.21(b)

DEVICE FOR IDENTIFYING OPTICAL DISC TYPE BASED ON DENSITY OF RADIAL INFORMATION TRACKS THEREON

FIELD OF THE INVENTION

The present invention relates to optical disc devices for reproducing information recorded on various types of optical discs, and more particularly relates to optical disc devices capable of easily identifying the types of the discs in a short time.

BACKGROUND OF THE INVENTION

Japanese laid-open publication (Tokukaihei) No. 3-207056 discloses a method of identifying the types of discs for optical disc devices using various types of optical discs. In this method, specific information signals (type identifying signals) recorded on the respective optical discs in advance are read out so as to identify various types of optical discs, more specifically to distinguish a music-use CD (compact disc) and a computer-use CD-ROM.

According to the method disclosed in the Japanese publication No. 3-207056, since information recorded on a disc is actually read out to identify the disc, it is possible to accurately identify the disc. However, in order to identify the type of disc, it is necessary to control the rotation speed of the disc to be a predetermined value and to control the focus servo and tracking servo when reading the information from the disc. Thereafter, by reading out information called "TOC" (table of contents) recorded in the innermost periphery section of the disc, the type of the disc is first identified. Then, the operation of a processing system is switched according to the result of the identifying process. Therefore, this method causes an increase in a so-called "starting time", that is the time taken from identification of the type of the disc to the completion of switching the operation of the device, including switching the processing system, performed after the identifying process.

Hence, in an optical disc device using various types of optical discs, even if the basic physical properties of discs, such as the signal frequency and recording density of the recorded information or the rotation speed and linear velocity, etc. of the discs, are substantially the same like in a music-use CD and computer-use CD-ROM, a long time and a number of processes are required to start the optical disc device.

In an optical disc device using various types of discs (for example, CD and DVD (digital video disc)), which are different from each other in their physical properties, particularly in the recording density and track pitch, to a greater degree than the degree of the difference between a music-use CD and a computer-use CD-ROM, it is often necessary to perform the process of switching an optical system of an optical pickup in order to obtain better signal reproduction characteristics in some cases. There also may be a possibility that there is a difference in the linear velocity, i.e., the rotation speed of the disc, between discs having different physical properties. In such a case, it is necessary to increase or decrease the rotation speed of the disc. Of course, the above-mentioned processes can only be carried out after identifying the type of a disc. As a result, it takes a long time to start the optical disc device.

As described above, with the prior art disclosed in the above-mentioned publication concerning an optical disc device for reproducing information recorded on various types of optical discs, a long time is required to identify the type of disc and an additional time-consuming process needs to be performed in accordance with the result of the identifying process. Thus, this technique suffers from a problem that the starting time of the optical disc device becomes longer.

SUMMARY OF THE INVENTION

It is an object of the present invention to provide an optical disc device capable of reproducing information from various types of optical discs whose physical properties, particularly information recording densities and track pitches, are different from each other to a great degree, identifying the types of the optical discs in a short time, and shortening the starting time.

In order to achieve the above object, an optical disc device of the present invention is an optical disc device for reproducing information recorded on an information track of an optical disc, and includes:

a pickup for applying a light beam to an information-recorded side of the optical disc, receiving light reflected from the information-recorded side, and outputting a readout signal based on the quantity of the light received;

an amplitude indicating signal generating section for generating an amplitude indicating signal varying-according to a change in the amplitude of the readout signal which occurs when the light beam is displaced relative to the information track in a radial direction of the optical disc; and an identifying section for identifying the type of optical disc based on the density of information tracks in a radial direction of the optical disc by comparing the difference between the maximum value and the minimum value of the amplitude indicating signal with a predetermined value.

In the optical disc device, the amplitude of the readout signal output by the pickup according to the quantity of the reflected light is the difference between the peak value and the bottom value of the readout signal. The amplitude of the readout signal increases when the light beam is positioned just above the information track. Meanwhile, the amplitude of the readout signal decreases when the light beam is displaced from the center of the information track in a radial direction of the optical disc because the contrast of the quantity of the reflected light becomes smaller.

The amplitude of the readout signal becomes smaller with a decrease in the ratio of the area of the information track irradiated with the light beam to the total area irradiated with the light beam. On the other hand, the amplitude of the readout signal becomes larger with an increase in the ratio of the area of the information track irradiated with the light beam to the total area irradiated with the light beam. Therefore, when moving the light beam relative to the information track in a radial direction of the optical disc, the amplitude of the readout signal increases at the time the light beam is positioned just above the information track, and decreases at the time the light beam is positioned between two adjacent information tracks. Thus, the increase and decrease of the amplitude occurs repeatedly.

Hence, when the density of the information tracks of the optical disc in a radial direction of the optical disc is low, the ratio of the area of the information track irradiated with the light beam to the total area irradiated with the light beam is small at the time the light beam is positioned between two adjacent information tracks. As a result, the amplitude of the readout signal from this area is very small. Accordingly, the amplitude changes greatly when the light beam is moved relative to the information track in a radial direction of the optical disc. Consequently, the changes in the amplitude of the readout signal appear clearly, and variations in the amplitude indicating signal, which represent the changes in the amplitude, also are clear.

When the density of the information tracks of the optical disc in a radial direction of the optical disc is high, even if the light beam is positioned between two adjacent information tracks, the ratio of the information track irradiated with the light beam to the total area irradiated with the light beam is not as small as the ratio in the above-mentioned case. Therefore, the amplitude of the readout signal from this area is not as small. Consequently, the changes in the amplitude of the readout signal when the light beam is moved relatively to the information track in a radial direction of the optical disc is not as large. As a result, the variations in the amplitude indicating signal output by the amplitude indicating signal generating section are not as clear as the variations observed when the density of the information tracks is low.

Hence, by comparing the difference between the maximum value and minimum value of the amplitude indicating signal with a predetermined value in the identifying section, it is possible to identify the types of a plurality of optical discs having different information track densities in a radial direction of the optical discs.

Moreover, in order to achieve the above object, another optical disc device of the present invention for reproducing information recorded on an information track of an optical disc, includes:

a pickup for applying a light beam to an information-recorded side of the optical disc, receiving light reflected from the information-recorded side, and outputting a readout signal based on the quantity of the light received;

an amplitude indicating signal generating section for generating an amplitude indicating signal varying according to a change in the amplitude of the readout signal which occurs when the light beam is displaced relative to the information track in a radial direction of the optical disc; and an identifying section for identifying the type of the optical disc based on the density of information tracks in a radial direction of the optical disc by comparing the ratio between the maximum value and the minimum value of the amplitude indicating signal with a predetermined value.

This optical disc device is. different from the above-mentioned optical disc device since the identifying section detects the type of the optical disc based on the ratio between the maximum value and minimum value of the amplitude indicating signal. Thus, it is possible to limit the influences of the variations in the quantity of light in the light beam and in the reflectivity of the optical disc. The above-mentioned ratio does not include elements relating to the sensitivity and characteristic of the optical pickup, the quantity of light in the light beam, or the reflectivity and modulation factor of the optical disc. More specifically, since the abovementioned ratio only includes an element relating to the density of the information tracks in a radial direction of the optical disc, it is possible to accurately identify the various types of optical discs having different track pitches.

Either of the above-mentioned optical disc devices can identify various types of optical discs having different information recording densities at an early stage, thereby significantly shortening the starting time of optical disc devices using various types of optical discs.

For a fuller understanding of the nature and advantages of the invention, reference should be made to the following detailed description taken in conjunction with the accompanying drawings.

BRIEF DESCRIPTION OF THE DRAWINGS

FIGS. 6(a) to 6(c) are views explaining the theory of the present invention for identifying an optical disc having a high information track density.

FIG. 7 is a view showing the structure of a highpass filter for cutting the direct current component of a readout signal.

FIGS. 8(a) and 8(b) are views explaining an output waveform when the readout signal is input to the highpass filter shown in FIG. 7.

FIG. 9 is a view showing another structure of the disc type identifying section.

FIG. 12(a) is a perspective view showing a state in which the light beam is moved across the information track, FIG. 12(b) is a waveform illustration showing the relationship between the envelope of the readout signal at a given time and the mean value thereof, and FIG. 12(c) is a waveform illustration showing the amplitude indicating signal at a given time.

FIG. 18 is a block diagram showing the structure of an optical disc device according to the sixth embodiment of the present invention.

FIG. 21(a) is a perspective view showing a state in which a lens is driven in a radial direction of an optical disc, and FIG. 21(b) is a waveform illustration showing changes in the readout signal when the lens is driven.

DESCRIPTION OF THE PREFERRED EMBODIMENTS

Embodiment 1

The following description will explain the (1) structure, (2) theory, and (3) operation of an optical disc device according to the first embodiment of the present invention.

(1) Structure

Figure 1:
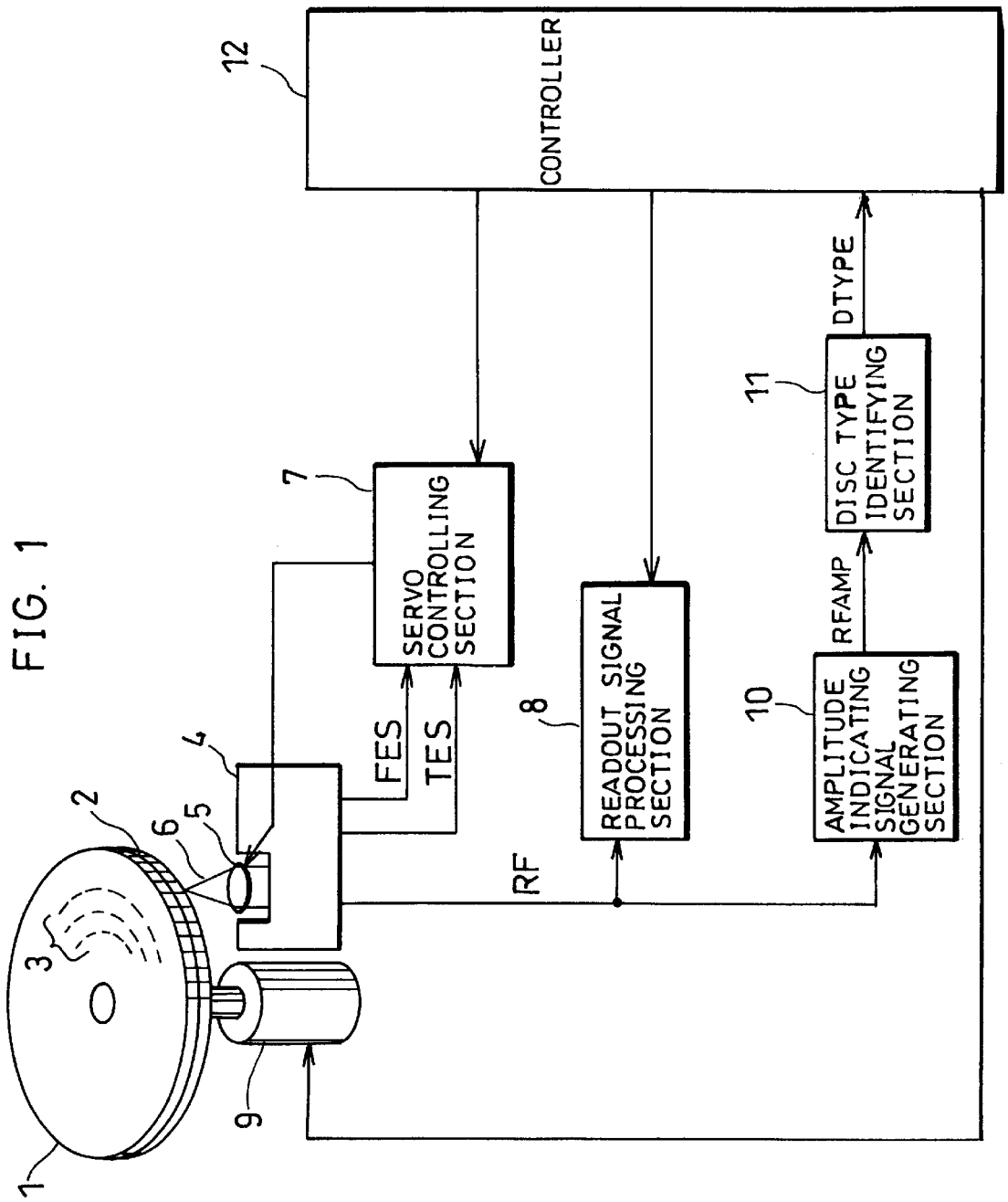
FIG. 1 is a block diagram of an optical disc device according to the first embodiment of the present invention.

FIG. 1 is a block diagram showing an optical disc device according to Embodiment 1 of the present invention. In FIG. 1, spiral or concentric information tracks 3 on which information are recorded in the form of pit strings is formed on an information recording side 2 of the optical disc 1 so that the interval between adjacent information tracks 3 in a radial direction of the optical disc 1 is uniform. An optical pickup 4 applies a light beam 6 converged by a lens 5 to the information track 3 and generates a readout signal RF (a signal indicating the quantity of light reflected from the optical disc 1) based on the light reflected from the information track 3, and also generates focusing error signal FES and tracking error signal TES as servo error signals used for position control (servo control) of the converged position of the light beam 6 relative to the information track 3. These FES and TES are guided to a servo control section 7, and control the position of the lens 5. Thus, the FES and TES are used to control the converged position of the light beam 6 to follow a target information track 3. A readout signal processing section 8 performs automatic gain control (AGC) to adjust the amplitude of the readout signal RF to a predetermined value, reproduces the recorded information by demodulating the readout signal RF, etc. before or after performing AGC. A spindle motor 9 rotates the optical disc 1.

An amplitude indicating signal generating section 10 uses the readout signal RF representing the quantity of light in the light beam 6 reflected from the information track 3 so as to generate an amplitude indicating signal RFAMP corresponding to the amplitude of the readout signal RF. An example of the amplitude indicating signal generating section 10 will be explained in more detail later with reference to FIG. 2.

A disc type identifying section 11 identifies the type of the optical disc 1 on the basis of the amplitude indicating signal RFAMP, and outputs an identification result signal DTYPE. An example of the structure of the disc type identifying section 11 will be explained in more detail later with reference to FIG. 3. The amplitude indicating signal generating section 10 and the disc type identifying section 11 serve as identifying means.

A controller 12, constituted by a microcomputer, receives the identification result signal DTYPE from the disc type identifying section 11, controls the servo controlling section 7, readout signal controlling section 8 (or the optical pickup 4), etc. as necessary, and performs controls relating to switching of the circuit characteristics (or switching of an optical system inside the optical pickup 4) and the entire operations of the device so as to achieve better signal reproduction and servo control characteristics.

Figure 2:
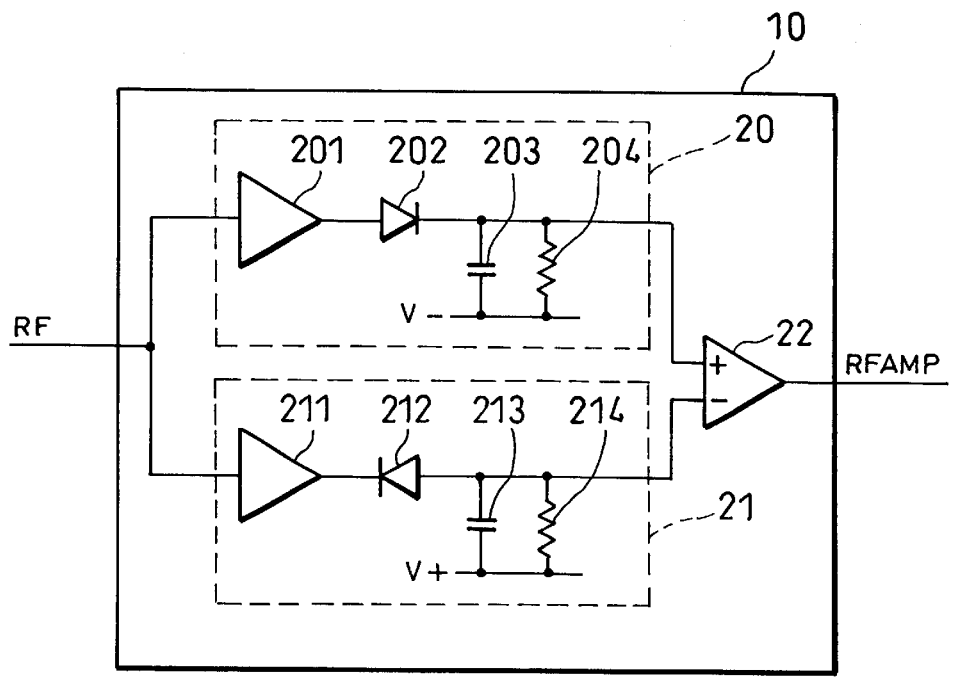
FIG. 2 is a circuit diagram showing the detailed structure of an amplitude indicating signal generating section shown in FIG. 1.

With reference to FIG. 2, the following description will explain an example of the structure of the amplitude indicating signal generating section 10 in further detail. An upper envelope detector 20 and a lower envelope detector 21 constituting envelope detecting means are formed by buffer amplifiers 201, 211, diodes 202, 212, capacitors 203, 213, and resistors 204, 214, respectively. In theory, after buffer-amplifying and an input signal by the buffer amplifiers 201 and 211, the upper envelope detector 20 and lower envelope detector 21 detect the positive peak of the diode 202 and capacitor 203, and detect the negative peak of the diode 212 and capacitor 213, respectively. Moreover, by suitably setting a time constant, which is determined by the product of the capacitor 203 (capacitance) and resistor 204 (resistance), and a time constant which is determined by the product of the capacitor 213 and resistor 214, it is possible to detect the respective envelopes on the upper (positive) side and lower (negative) side of the input readout signal RF. A subtracter 22 calculates the amplitude of the readout signal RF (more precisely, the amplitude of the envelopes) by subtracting an output of the lower envelope detector 21 from an output of the upper envelope detector 20, and outputs the result as the amplitude indicating signal RFAMP. The gain of the subtracter 22 can be 1 or some other arbitrary value.

Further, in the upper envelope detector 20, one of the connecting terminals of each of the capacitor 203 and resistor 204, which is not connected to the diode 202, is connected to a negative electric potential V−. On the other hand, in the lower envelope detector 21, one of the terminals of each of the capacitor 213 and resistor 214, which is not connected to the diode 212, is connected to a positive electric potential V+. These connections are made because it is necessary to bias one terminal of each capacitor by a voltage higher or lower than the expected maximum voltage or minimum voltage of a signal subjected to envelope detection according to the theory of the envelope detecting operation.

However, it is not necessary to always prepare positive and negative electric potentials for envelope detection. For example, when it is judged that the readout signal RF is not to be a negative voltage (for instance, an optical disc device using a single positive power supply), the range of voltage of the signal is from 0 volts to the positive power supply voltage. Therefore, it is preferred that the voltage which biases the capacitor of the envelope detector is set at 0 volt (the ground electric potential) in the upper envelope detector, and is set at the power supply voltage in the lower envelope detector.

Figure 3:
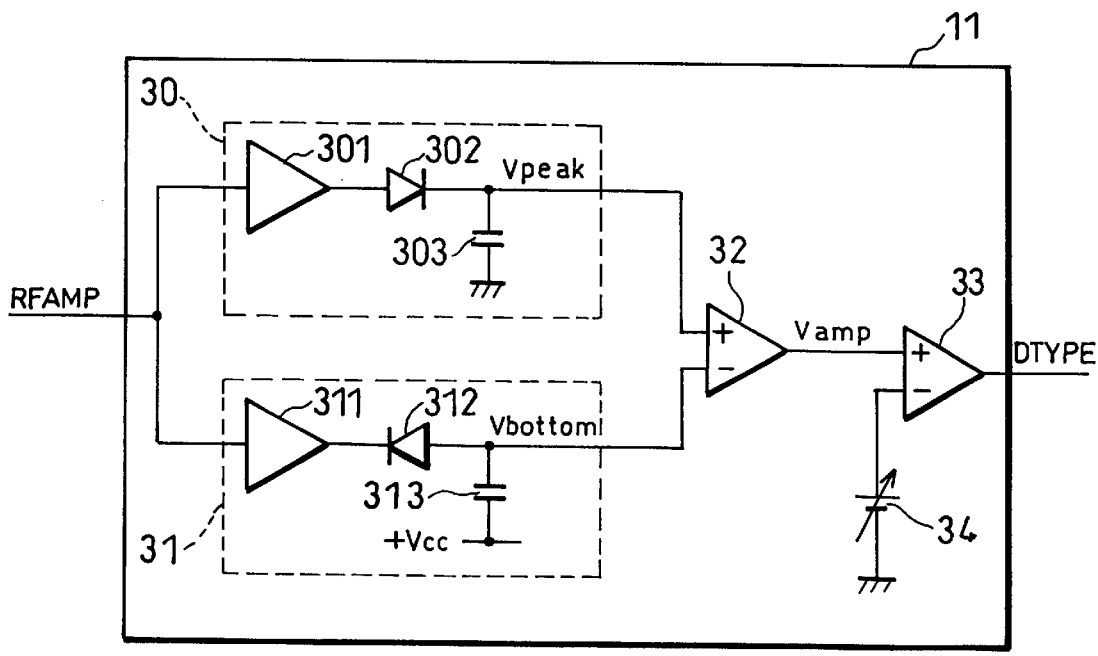
FIG. 3 is a circuit diagram showing the detailed structure of a disc type identifying section shown in FIG. 1.

Referring now to FIG. 3, the following description will explain an example of the structure of the disc type identifying section 11 in further detail. A peak detector 30 and a bottom detector 31 are formed by buffer amplifiers 301, 311, diodes 302, 312, and capacitors 303, 313, respectively. The peak detector 30 and bottom detector 31 respectively detect the maximum voltage (upper envelope) V-peak and the minimum voltage (lower envelope) V-bottom of the diodes 302, 312 and capacitors 303, 313 after buffer-amplifying the input amplitude indicating signal RFAMP by the buffer amplifiers 301 or 311, respectively. A subtracter 32 calculates the difference Vamp between the maximum V-peak and minimum V-bottom of the amplitude indicating signal RFAMP by subtracting an output of the lower envelope detector 31 from an output of the upper envelope detector 30. A comparator 33 acting as difference comparing means compares the voltage of a comparative voltage source 34 with the difference Vamp between the maximum value and minimum value of the amplitude indicating signal RFAMP obtained by the subtracter 32, and outputs the result of the comparison as the identification result signal DTYPE.

In addition, the voltage of the comparative voltage source 34 can be varied by the controller 12, etc. In the case when the quantity of the light beam 6 which is applied to the optical disc 1 by the optical pickup 4 varies, the readout signal RF, and in turn the amplitude indicating signal RFAMP representing the amplitude of the readout signal RF, vary. Therefore, in order to accurately identify the type of an optical disc, it is preferred that the voltage of the comparative voltage source 34 is variable as mentioned above. Needless to say, if there is no need to vary the voltage of the comparative voltage source 34 because of a small variation, the voltage of the comparative voltage source 34 can be set at a fixed value.

Similarly to capacitors 203, 213 in the upper envelope detector 20 and lower envelope detector 21 of the amplitude indicating signal generating section 10 explained in FIG. 2, a bias voltage is applied to one terminal of each of the capacitors 303, 313 in the peak detector 30 and bottom detector 31 of the disc type identifying section 11. However, since the amplitude indicating signal RFAMP to be input to the disc type identifying section 11 is a signal representing the result of subtracting the lower envelope from the upper envelope by the subtracter 22 in the amplitude indicating signal generating section 10, the amplitude indicating signal RFAMP can never be a negative voltage. Therefore, the bias voltage to be applied to the capacitors 303, 313 can be 0 volt (ground electric potential) for the capacitor 303 in the peak detector 30, and be a positive supply voltage (+Vcc) for the capacitor 313 in the bottom detector 31.

(2) Theory

According to the present invention, the theory of distinguishing optical discs having different information track densities in a radial direction of the discs on the basis of the readout signals RF will be explained below with reference to FIGS. 4 to 6.

Figure 4A:
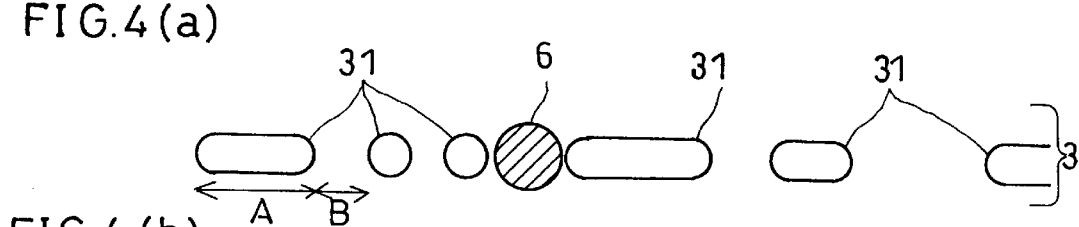
FIG. 4(a) is a plan view showing a state in which a light beam is moved relative to an information track.
Figure 4B:
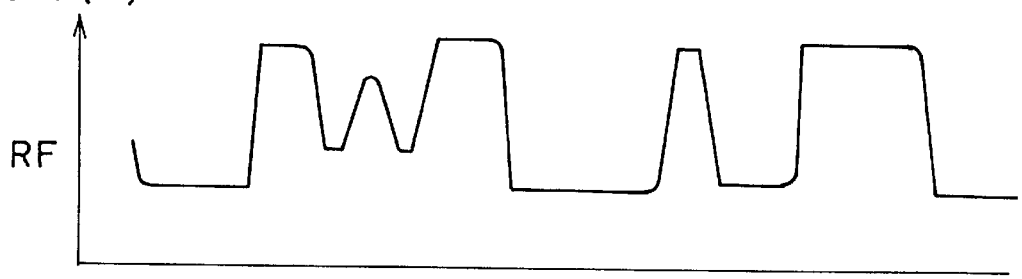
FIG. 4(b) is a view explaining changes in a readout signal with respect to time during movement of the light beam.

FIG. 4(a) shows a state in which the light beam 6 is moved on a single information track 3 along its longitudinal (tangential) direction. FIG. 4(b) shows changes in the readout signal RF with respect to time during movement of the light beam 6. When the light beam 6 is positioned on a pit 31 constituting the information track 3 (for example, on the A area in FIG. 4(b)), the quantity of light reflected from the optical disc 1 decreases because the light beam 6 is diffracted by the pit 31, and thus the level of the readout signal RF is lowered. On the other hand, when the light beam 6 is positioned between two pits 31 (for example in the B area in FIG. 4(b)), the quantity of light reflected from the optical disc 1 increases because it is hard to diffract the light beam 6, and therefore the level of the readout signal RF becomes higher. In particular, when the interval between two pits 31 is longer than a value which is almost the same as the diameter of the light beam 6, the quantity of reflected light is near a value obtained when the light beam 6 is reflected by an almost flat surface.

The amplitude of the readout signal RF corresponding to the quantity of reflected light is the difference between the high level and the low level. As illustrated in FIG. 4(b), when the light beam 6 is positioned on the center of the information track 3, the amplitude is increased. On the other hand, when the light beam 6 is displaced from the center of the information track 3 in a radial direction of the optical disc 1, i.e., when the ratio of an area of the information track 3 irradiated with the light beam 6 to the total area irradiated with the light beam 6 decreases, the contrast in the quantity of reflected light which varies depending on whether the light beam 6 is diffracted by the pit 31 or not is lowered, resulting in a decrease in the amplitude of the readout signal RF.

Figure 5A:
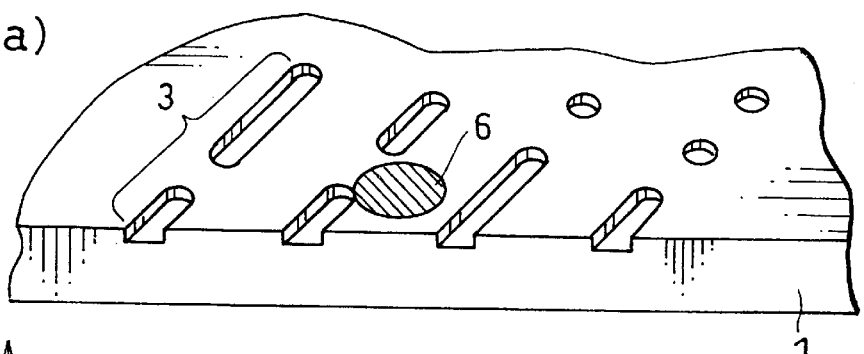
FIGS. 5(a) to 5(c) are views explaining the theory of the present invention for identifying an optical disc having a low information track density.
Figure 5B:
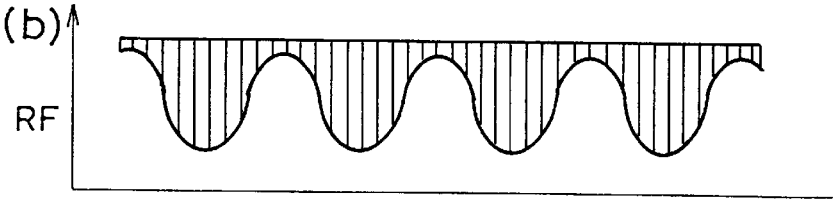
Figure 5C:
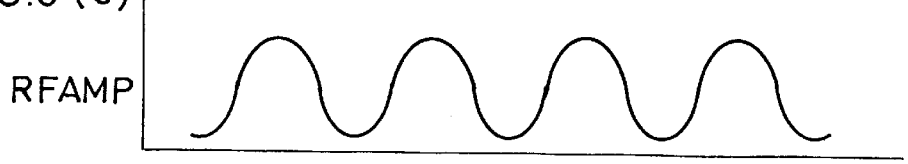

FIGS. 5(a) to 5(c) and FIGS. 6(a) to 6(c) are enlarged explanatory views depicting other states in which the light beam 6 is applied to the optical disc 1. FIGS. 5(b) and 6(b) show changes in the readout signal RF (which are observed when the light beam 6 crosses the information track 3) according to the position of the light beam 6 relative to the information track 3 in a radial direction of the optical disc 1. FIGS. 5(c) and 6(c) show changes in the amplitude indicating signal RFAMP according to the position of the light beam 6 relative to the information track 3 in a radial direction of the optical disc 1. FIGS. 5(a) and 6(a) the relative positional relationship between the light beam 6 and the optical disc 1. FIGS. 5(a) to 5(c) show the relationship when the density of the information tracks 3 in a radial direction of the optical disc 1 is low. FIGS. 6(a) to 6(c) show the relationship when the density is high.

As explained above with reference to FIGS. 4(a) and 4(b), the amplitude of the readout signal RF becomes smaller with a decrease in the ratio of an area of the information track 3 irradiated with the light beam 6 to the total area irradiated with the light beam 6, but becomes higher with an increase in that ratio. Accordingly, in the event when the light beam 6 is moved relative to the information track 3 in a radial direction of the optical disc 1, the amplitude of the readout signal RF increases at the time the light beam 6 is positioned just above the information track 3, while the amplitude of the readout signal RF decreases at the time the light beam 6 is positioned between two adjacent information tracks 3. Thus, an increase and decrease in the amplitude repeatedly occurs.

Therefore, in the state shown in FIG. 5(a) in which the density of the information tracks 3 in a radial direction of the optical disc 1 is low, when the light beam 6 is positioned between two adjacent information tracks 3, the ratio of an area of the information track 3 irradiated with the light beam 6 to the total area irradiated with the light beam 6 is very small. Accordingly, the amplitude of the readout signal RF is extremely low when the light beam 6 is located in such a position. Consequently, the change in the amplitude of the readout signal RF when the light beam 6 is moved relative to the information track 3 in a radial direction of the optical disc 1 becomes larger. As a result, an increase and decrease in the amplitude of the readout signal RF appears clearly, and variations in the amplitude indicating signal representing the increase and decrease of the amplitude of the readout signal RF are also exhibited clearly.

On the other hand, in the state shown in FIG. 6(a) in which the density of the information tracks 3 in a radial direction of the optical disc 1 is high, even when the light beam 6 is positioned between two adjacent information tracks 3, the ratio of an area of the information track 3 irradiated with the light beam 6 to the total area irradiated with the light beam 6 is not as small as that shown in FIG. 5(a). Accordingly, the amplitude of the readout signal RF does not decrease much when the light beam 6 is located in such a position. Therefore, the change in the amplitude when the light beam 6 is moved relative to the information track 3 in a radial direction of the optical disc 1 is not as large. As a result, variations in the amplitude indicating signal RFAMP tend to be less clear in comparison to those shown in FIG. 5(c).

Hence, it is possible to distinguish various types of optical discs whose information track density in the disc's radial direction differs from each other by observing their amplitude indicating signals RFAMP.

Further, in the case where the light beam 6 is positioned between two information tracks 3, the light beam 6 is diffracted to some extent by the pits on the information tracks 3 on the right and left side of the light beam 6. However, there is a possibility that no pits exist in both the information tracks 3 on the right and left sides of the light beam 6 so that a moment at which the light beam 6 can hardly be diffracted exists, depending on the contents of recorded information. In this case, like the e abovementioned case where the light beam 6 is positioned between two pits constituting the information track 3 as shown in FIG. 4(*a*), the quantity of the light beam 6 is equivalent to the quantity of the light beam 6 applied to an almost flat portion of the optical disc 1, and the quantity of reflected light is great. Thus, the maximum value is substantially uniform regardless of whether the light beam 6 is positioned on the information track 3 or between the information tracks 3. In this case, the maximum level of the readout signal RF is determined in the manner previously discussed.

In addition, particularly in an optical disc device with a single power supply, because of internal circuit structure of an integrated circuit, it is often desired that the DC component is temporarily cut off by AC coupling the readout signal RF so as to produce an AC signal around a new DC voltage. More specifically, by passing the readout signal RF through a high-pass filter 40 formed by a capacitor 401 and resister 402 shown in FIG. 7, the output becomes a signal RF' which varies around a reference voltage Vref regardless of the DC component of the original signal RF. If the readout signal RF produced when the light beam 6 crossed the information track 3 is input to such a high-pass filter 40, the signal RF' output from the high-pass filter 40 may have a waveform that exhibits pulsation or shifts in the level of the original RF as shown in FIG. 8(*b*). On the other hand, in the amplitude indicating signal generating section 10 of this embodiment, which detects upper and lower envelopes and generates an amplitude indicating signal on the basis of the difference between the detected values, it is possible to generate a signal indicating the amplitude of the readout signal RF (or RF') accurately without affect by such pulsation and shifts. Thus, the readout signal RF to be input to the amplitude indicating signal generating section 10 can be a signal retaining a DC component, or a signal after AC coupling, thereby ensuring high flexibility in designing the circuit. For comparison purposes, a readout signal RF retaining a DC component is shown in FIG. 8(*a*)

(3) Operation

Referring now to FIG. 1, the following description will explain the operation of an optical disc device of this embodiment.

The controller 12 gives instructions so that the spindle motor 9 is started to rotate at a specified rotation speed, the optical pickup 4 emits the light beam 6, and the servo control section 7 starts focus-servo-control to control the focal point of the converged light beam 6 to be on the information-recorded side 2 of the optical disc 1.

Since the axis of rotation of the optical disc 1 and the center of concentric or spiral information tracks 3 do not usually coincide with each other, even when the optical pickup 4 does not move the position of the light beam 6, the light beam 6 crosses the information tracks 3 in a radial direction of the optical disc 1 relative to the rotation of the optical disc 1. As a result, as explained with reference to FIGS. 4 to 6, the amplitude of the readout signal RF is increased and decreased, and the amplitude indicating signal RFAMP as the output of the amplitude indicating signal generating section 10 shown in FIG. 2 varies according to the increase and decrease in the amplitude of the readout signal RF.

The disc type identifying section 11 (see FIG. 3) observes the amplitude indicating signal RFAMP. As explained with reference to FIGS. 5(*a*), (*b*), (*c*) and FIGS. 6(*a*), (*b*), (*c*), when the track pitch is large, i.e., when the density of the information tracks 3 in a radial direction of the optical disc 1 is low, the variation in the amplitude indicating signal RFAMP is large, and the difference between the maximum value and the minimum value of the amplitude indicating signal RFAMP is large. Therefore, the difference between the maximum value and the minimum value of the amplitude indicating signal RFAMP is calculated (Vamp shown in FIG. 3). If the difference exceeds a predetermined level (the voltage of the comparative voltage source 34 shown in FIG. 3), it is judged that the optical disc has a large track pitch, i.e., a low density of information tracks in the radial direction. When the difference between the maximum value and the minimum value is not greater than the predetermined level, it is judged that the optical disc has a small track pitch, i.e., a high density of information tracks in the radial direction. Then, an identification result signal DTYPE is sent to the controller 12. The time taken for identification is about the time required for the light beam 6 to cross about several information tracks 3, and more specifically a very short time ranging from several ms to several tens of ms.

The voltage of the comparative voltage source 34 shown in FIG. 3 is determined according to the type of a disc to be identified. By setting the voltage at plural levels, it is possible to identify at least three types of discs. Moreover, the voltage of the comparative voltage source 34 is made variable according to changes in conditions such as the quantity of light of the light beam 6 as mentioned above.

If the specified value of the rotation speed given in starting the spindle motor 9 is inappropriate, the controller 12 gives a new instruction to control the rotation speed according to the identification result signal DTYPE. Moreover, in order to achieve improved signal reproduction and servo control characteristics, if necessary, the controller 12 instructs the servo control section 7, readout signal processing section 8, optical pickup 4, etc. to switch the circuit characteristics and the optical system inside the optical pickup 4. Alternatively, when switching the characteristics of the servo control section 7, the controller 12 interrupts the focus servo control temporarily, and performs a control to resume the focus servo control after switching the characteristics of the servo control section 7, if necessary. Thereafter, the controller 12 controls the servo control section 7 to start tracking servo control for reproduction of information.

The identification of the types of optical discs, and all or almost all of operations for switching the characteristics of the respective sections of the device according to the identification, can be performed simultaneously within a time (usually ranging from around several hundred milliseconds to around several seconds) which is taken for the optical disc 1 to reach a steady rotation speed, i.e., a rotation speed required to normally reproduce recorded information, after sending the start rotation instruction to the spindle motor 9. It is particularly important that the identification of the type of the optical disc 1 can be started if the focus servo control is started. Namely, it is possible to start the identification of the type of the optical disc 1 even if the spindle motor 9 and the optical disc 1 do not reach a predetermined rotation speed and tracking servo control is not performed. For the identification, as described above, it takes only a short time of about that required for several information tracks 3 to be displaced relative to the light beam 6.

Accordingly, it is possible to determine at an early stage the necessity of switching the settings and characteristics of the respective sections of the device and of changing the rotation speed of the spindle motor 9, and of carrying out the corresponding operations. As a result, the total time taken for starting the optical disc device can be shortened compared to a conventional device.

If the above-mentioned operation is to be performed according to the conventional method disclosed in Japanese laid-open publication (Tokukaihei) No. 3-207056, it is necessary to control the rotation speed of the optical disc 1 to be a predetermined value, to perform focus servo control and tracking servo control, and to move the light beam 6 to an information track whereon specific information is recorded so as to read out the information recorded on a specific position of the optical disc 1. In this method, the type of the optical disc 1 can be finally identified at the time the specific information has been read out. At this time, the characteristics and operations of the respective sections are switched, and a new rotation speed instruction is given to the spindle motor 9. Since normal reproduction of information is started after the optical disc 1 reaches the newly specified rotation speed, the total starting time of the optical disc device is significantly increased.

Embodiment 2

The second embodiment of the present invention differs from the first embodiment in the structure and operation of the disc type identifying section 11. Here, only the differences between the first and second embodiments will be explained, and explanations for the same structures and operations will be omitted.

FIG. 9 shows the structure of the disc type identifying section 11 of the second embodiment. Each of the peak detector 30 and bottom detector 31 are the same as the first embodiment shown in FIG. 3 in terms of their inner structure and ability to detect the maximum value V-peak and the minimum value V-bottom of the input amplitude indicting signal RFAMP.

A divider 35 outputs the result of dividing V-peak by V-bottom, i.e., the ratio Vquot between V-peak and V-bottom.

The comparator 33 (ratio comparing means) compares the voltage of the comparative voltage source 34 and the ratio Vquot between the maximum value and the minimum value of the amplitude indicating signal RFAMP, given by the divider 35, and outputs the identification result signal DTYPE which indicates whether the ratio Vquot is greater or smaller than the voltage of source 34.

In order to suppress the influence on the disc type identification of changes in the quantity of the light beam 6 applied to the optical disc 1 by the optical pickup 4 and changes in the reflectivity of the optical disc 1, the disc type identifying section 11 of the second embodiment calculates the ratio between the maximum value V-peak and the minimum value V-bottom of the amplitude indicating signal RFAMP by dividing V-peak by V-bottom.

Since the maximum value V-peak and minimum value V-bottom of the amplitude indicating signal RFAMP indicate the amplitude of the readout signal RF when the light beam 6 is positioned on the information track 3 or positioned between two adjacent information tracks 3, they can be written as $$Vpeak = k\,p\,r\,m \quad (1),$$

$$Vbottom = k\,p\,r\,m\,d \quad (2)$$

where k is a constant including the sensitivity and gain of each optical system of the optical pickup 4 and the circuit system for generating the readout signal RF, p is the quantity of the light beam 6 applied to the optical disc 1 by the optical pickup 4, r is the reflectivity ($0 < r \leq 1$) at the flat portion of the optical disc 1, m is the modulation factor of the readout signal RF when the light beam 6 is positioned on the information track 3 (the ratio of the amplitude of the readout signal RF to the quantity of light at the flat portion: $0 < m \leq 1$), and d is the ratio between a modulation factor of the readout signal RF when the light beam 6 is positioned between two adjacent information tracks 3 and a modulation factor of the readout signal RF when the light beam 6 is positioned on the information track 3 ($0 < d \leq 1$).

Figure 10A:
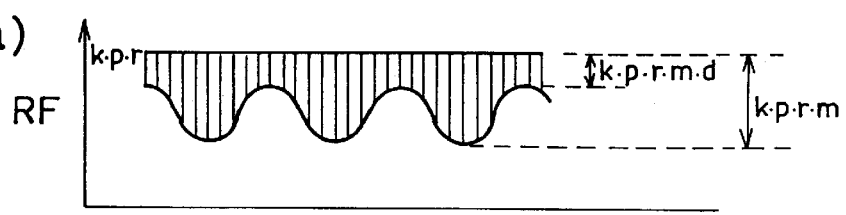
FIG. 10(a) shows the waveform of a readout signal.
Figure 10B:
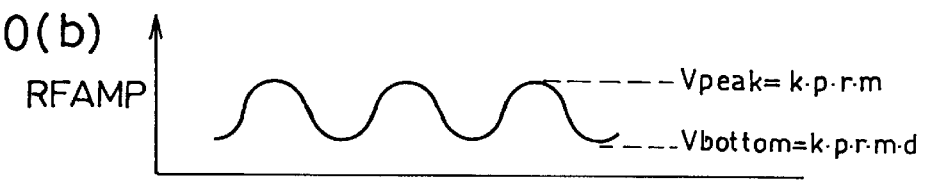
FIG. 10(b) shows the waveform of an amplitude indicating signal.

The relationship between equations (1), (2) and the signals RF, RFAMP are shown in FIGS. 10($a$) and 10($b$). In order to simplify the explanation, in equations (1), (2) and FIGS. 10($a$) and 10($b$), the gains of the buffer amplifiers 301, 311 in the peak detector 30 and bottom detector 31 of the disc type identifying section 11 shown in FIG. 9 are set at 1.

Here, the ratio Vquot representing the result of dividing V-peak by V-bottom is given by $$Vquot = (1/d) \quad (3).$$

Equation (3) does not include any term relating to the sensitivity and characteristic of the optical pickup 4, the quantity of the light beam 6, or the reflectivity and modulation factor of the optical disc 1. Equation (3) includes only a term d. As explained in the first embodiment with reference to FIGS. 4($a$), ($b$) to 6($a$), ($b$), ($c$), since this term relates to the track pitch of the optical disc 1, i.e., the density of the information tracks 3 in a radial direction of the optical disc 1, it can be said that it is possible to extract only the information relating to the track pitch by division. Consequently, in the second embodiment, it is possible to more accurately distinguish optical discs of different track pitches.

In the first embodiment, in order to distinguish optical discs of different track pitches, Vamp representing the difference between V-peak and V-bottom is calculated, instead of dividing V-peak by V-bottom. However, as shown in equation (4) below, since Vamp includes the above-mentioned various terms other than d, if these characteristic terms vary, Vamp is affected significantly. It is therefore difficult to identify the types of the optical discs.

$$Vamp = Vpeak - Vbottom = k \cdot p \cdot r \cdot m - k \cdot p \cdot r \cdot m \cdot d = k \cdot p \cdot r \cdot m \cdot (1-d) \quad (4)$$

In the disc type identifying section 11 of the first embodiment, the voltage of the comparative voltage source 34 is preferably made variable so as to meet the variations in the characteristic terms.

However, the disc type identifying section 11 of the second embodiment only extracts the term relating to the track pitch of the information tracks 3 on the optical disc 1 in theory, and is not affected by the variations in the other various terms. Thus, the voltage of the comparative voltage source 34 can be set at a fixed value. Of course, even when the voltage is variable, no problem arises because the precision and accuracy of identification can be improved by, for example, making a fine adjustment of the voltage. Besides, this voltage is determined according to the type of optical disc to be identified. If the voltage is set at a plurality of values, it is possible to identify more than two types of the optical discs.

Alternatively, it is possible to obtain Vquot' by dividing V-bottom by V-peak as expressed by equation (5), instead of dividing V-peak by V-bottom.

$$V_{quot}' = d \tag{5}$$

However, the difference between Vquot' and Vquot appears in the difference in the sensitivity in identifying the types of optical discs. In order to confirm the difference, when Vquot given by equation (3) and Vquot' of equation (5) are respectively differentiated by d, the rate of change with respect to a change of d is given by equation (6) or (7).

$$\_(V_{quot})/\_d = -(1/d^2) \tag{6}$$

$$\_(V_{quot}')/\_d = 1 \tag{7}$$

Here, when $(0 < d \leq 1)$ is taken into account, the absolute value in equation (6) is greater than the absolute value in equation (7). In other words, when the track pitch of the information tracks 3 varies slightly, Vquot shows a greater change than Vquot'. Therefore, when calculating the ratio between the maximum value V-peak and the minimum value V-bottom of the amplitude indicating signal RFAMP, it is preferred to divide V-peak by V-bottom because dividing V-peak by V-bottom achieves a higher sensitivity in identification and more accurately distinguishes optical discs of different track pitches than by dividing V-bottom by V-peak.

Embodiment 3

The third embodiment of the present invention differs from the second embodiment in the structure of the disc type identifying section 11. Here, only the differences will be (1) fetching the digital data- of the amplitude indicating signal RFAMP from the A/D converter 36 for a period between several ms and several ten ms, and extracting the maximum value and minimum value thereof;

(2) dividing the maximum value of the fetched digital data by the minimum value; and (3) comparing the result of the division with a predetermined reference value, and outputting the identification result signal DTYPE indicating whether the result of division is greater or smaller than the reference value.

In the processing step (1), the digital data is read out from the A/D converter 36 in a period between several ms and several tens of ms. In this period, the light beam 6 usually passes across at least several information tracks 3 on the optical disc 1. Therefore, if the maximum value and minimum value of the digital data in this period are extracted, it is possible to obtain a result equivalent to the result obtained by detecting the maximum value and minimum value of the RFAMP by the peak detector 30 and bottom detector 31 in the second embodiment.

Next, in step (2), division like the division performed by the divider 35 is carried out . Finally, in step (3), the result of step (2) and the voltage of the comparative voltage source 34 are compared in the same manner as in the comparator 33. Therefore, when the operations of the disc type identifying section 11 of the second and third embodiments are seen from the outside, there is no difference between them. Thus, the third embodiment can possess the merits of the disc type identifying section 11 of the second embodiment.

According to the structure of the third embodiment, since the disc type identifying section 11 can carry out all of the processing steps based on software after converting the amplitude indicating signal RFAMP into digital data by the A/D converter 36, no analog circuit is required. Consequently, the structure of the third embodiment has merits in terms of the stability of operation and the integration of circuits. In particular, when a microcomputer is used as the controller 12 for controlling the entire device as shown in FIG. 1 of the first embodiment, the microcomputer 37 of the disc type identifying section 11, and the A/D converter 36 can be integrated with the microcomputer for the controller 12. In this case, it is possible to produce further benefits in the cost, the on-board circuit size, etc.

Embodiment 4

The fourth embodiment of the present invention illustrates a modified example of the structure of the amplitude indicating signal generating section 10 shown in FIG. 2 of the first embodiment. Here, only the differences between this embodiment and the first to third embodiments will be explained, and explanations for the same structures will be omitted.

The amplitude indicating signal generating section 10 shown in FIG. 2 detects both of the upper envelope and the lower envelope of a readout signal RF, and generates an amplitude indicating signal RFAMP based on the difference therebetween. However, it is possible to generate a signal indicating the amplitude of the readout signal RF by calculating the mean value of the readout signal RF. The fourth embodiment employs this approach as described in detail below.

First, an explanation will be made of the readout signal RF (which retains the original DC component without AC coupling) when the light beam 6 was moved across the information track 3 in a radial direction of the optical disc 1. Referring to FIGS. 5 and 6, the upper envelope does not show a much change irrespective of whether the light beam 6 is positioned on the information track 3 or between the information tracks 3 because of the following reason. As explained with reference to FIGS. 4 to 6, in either case, there is a moment at which pits forming the information track 3 are hardly irradiated with the light beam 6, and the quantity of the reflected light becomes substantially the same as the quantity of light reflected when the light beam 6 is applied to an almost flat portion of the optical disc 1. On the other hand, since the degree of diffraction of the light beam 6 by the pit varies depending on whether the light beam 6 is positioned on the information track 3 or between the information tracks 3, the lower envelope varies according to an increase and decrease in the quantity of the reflected light.

Next, the following description will discuss the mean value of the readout signal RF with reference to FIGS. 12(a) to 12(c) showing changes in the readout signal RF when the light beam 6 was moved across the information tracks 3 in a radial direction of the optical disc 1. FIG. 12(a) is a depiction indicating the relative positional relationship between the light beam 6 and the information track 3. FIG. 12(b) is a view indicating the mean value of the readout signal RF. FIG. 12(c) is a view explaining the amplitude indicating signal RFAMP when the readout signal RF is represented by the difference between the maximum and minimum values and by the average thereof.

As illustrated by the broken line in FIG. 12(b), the mean value represents the intermediate value between the upper envelope and the lower envelope, i.e., a level given by dividing the sum of the upper envelope and the lower envelope by 2.

In FIG. 12(b), the levels of the upper and lower envelopes of the readout signal RF are denoted by RFp and RFb, respectively. A subscript "1" is added when the light beam 6 is positioned on the information track 3, while a subscript "2" is added when the light beam 6 is positioned between the information tracks 3. Here, if the results of calculating an amplitude indicating signal based on the difference between the upper and lower envelopes or the mean value of the readout signal RF are distinguished from each other by adding a subscript "1" or "2" to RFAMP(dif) and RFAMP (avg) according to the position of the light beam 6, the respective amplitude indicating signals can be given by equations (8) to (11) below.

When the light beam 6 is positioned on the information track 3, $$\text{RFAMP(dif)}_1 = \text{RFp}_1 - \text{RFb}_1 \qquad (8), \text{ and}$$

$$\text{RFAMP (avg)}_1 = (\text{RFp}_1 + \text{RFb}_1)/2 \qquad (9).$$

When the light beam 6 is positioned between the information tracks 3, $$\text{RFAMP (dif)}_2 = \text{RFP}_2 - \text{RFb}_2 \qquad (10), \text{ and}$$

$$\text{RFAMP (avg) 2} = (\text{RFp2} + \text{RFb2})/2 \qquad (11)$$

Besides, the p-p value of the amplitude of the amplitude indicating signal is given by equations (12) and (13) below.

The p-p value of the amplitude (change) of the amplitude indicating signal is given by $$\begin{aligned}
RFAMP(dif)_{p-p} &= RFAMP(dif)_1 - RFAMP(dif)_2 \\
&= (RFp_1 - RFb_1) - (RFp_2 - RFb_2), \text{ or}
\end{aligned} \qquad (12)$$

$$\begin{aligned}
RFAMP(avg)_{p-p} &= RFAMP(avg)_1 - RFAMP(avg)_2 \\
&= (RFp_1 + RFb_1 - RFp_2 - RFb_2)/2.
\end{aligned} \qquad (13)$$

Here, since the level of the upper envelope is almost uniform irrespective of whether the light beam 6 is positioned on the information track 3 or between the information tracks 3, if $RFp_1 = RFP_2$, $$\text{RFAMP (dif)}_{P-P} = \text{RFb}_2 - \text{RFb}_1 \qquad (14),$$

and $$\text{RFAMP (avg)}_{P-P} = (\text{RFb}_1 - \text{RFb}_2)/2 \qquad (15).$$

It can be understood from equations (14) and (15) that, compared to the amplitude indicating signal RFAMP(dif) obtained from the difference between the upper and lower envelopes of the readout signal RF, the amplitude indicating signal RFAMP(avg) obtained by the mean value of the readout signal RF shows one second of the amplitude, and its polarity is inverted (see FIG. 12(c)). This means that the level of the amplitude indicating signal when the light beam 6 is positioned between the information tracks 3 is in inverse relation to the level of the amplitude indicating signal when the light beam 6 is positioned on the information track 3, and the amplitude in the former case is half of the amplitude in the latter case. If these factors are taken into consideration, it is possible to distinguish the types of optical discs having different track pitches based on the amplitude indicating signal obtained from the mean value of the readout signal RF.

Figure 13:
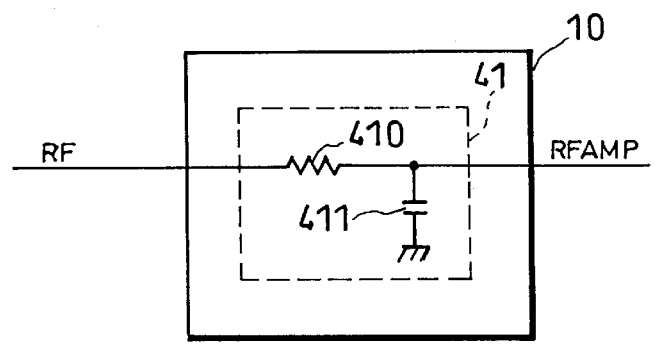
FIG. 13 is a circuit diagram showing another structure of the amplitude indicating signal generating section.

FIG. 13 shows the structure of the amplitude indicating signal generating section 10 of the fourth embodiment. In order to obtain the mean value, a lowpass filter 41 (mean value detecting means) is formed by a resister 410 and a capacitor 411. The cutoff frequency of the low-pass filter 41 which is determined by the time constants of the resister 410 and capacitor 411 are arranged to be higher than the repetitive frequency of the information tracks 3 expected when the light beam 6 is moved across the information tracks 3, but lower than the signal frequency of the readout signal RF. In the case when the optical disc 1 is rotated at a steady rotation speed, the signal frequency of the RF is usually between several hundred kHz and several MHz. However, if the focus servo control is started to identify the type of the optical disc 1 when starting the rotation of the spindle motor 9 for the purpose of shortening the starting time, the rotation speed becomes much lower than the steady value. However, since it is usually sufficient for estimating the rotation speed to be lowered to about one tenth of the steady value, the signal frequency of the readout signal RF in starting the rotation of the spindle motor 9 can be estimated between several ten kHz and several hundred kHz. On the contrary, since the estimated repetitive frequency of the information tracks 3 when the light beam 6 is moved across the information tracks 3 is usually between about several hundred Hz and about several kHz, it is appropriate to set the cutoff frequency of the low-pass filter 41 between about several hundred kHz and about several tens of kHz.

Since the amplitude indicating signal generating section 10 of the fourth embodiment can be formed by a simple low-pass filter 41, it is possible to construct the amplitude indicating signal generating section 10 at low cost.

In order to distinguish the optical discs of different track pitches from the amplitude indicating signal generated based on the mean value of the readout signals RF, the difference between the peak value and the bottom value of the amplitude indicating signal can be obtained like in the disc type identifying section 11 of the first embodiment, or the result of division (ratio) between the peak value and the bottom value can be obtained like in the second embodiment or the third embodiment.

Figure 14A:
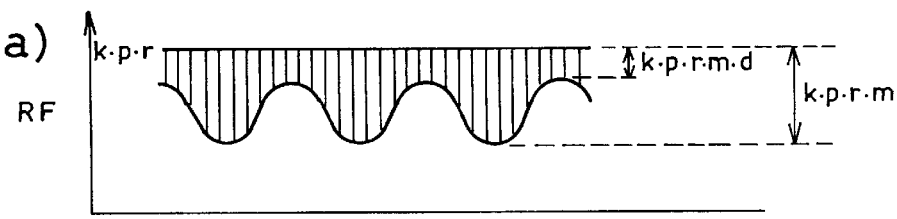
FIGS. 14(a) and 14(b) are waveform illustrations showing the readout signal and amplitude indicating signal at the time the light beam is moved across the information track.
Figure 14B:
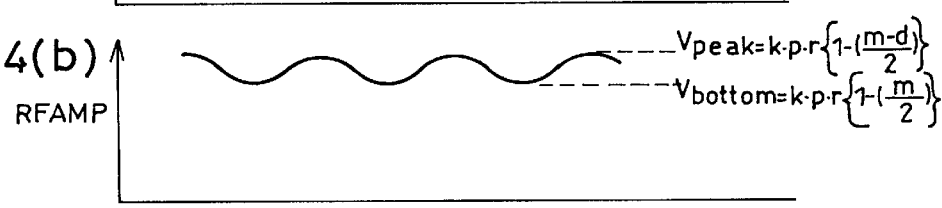

FIGS. 14(a) and 14(b) indicate changes in the readout signal RF and changes in the amplitude indicating signal RFAMP obtained from the mean value of the readout RF, respectively, when the light beam 6 was moved across the information tracks 3 in a radial direction of the optical disc 1. In these figures, the definitions of the letters used in equations (1) and (2) of the second embodiment are used for indication of the level and amplitude of the signal.

Referring to FIGS. 14(a) and 14(b), Vamp representing the difference between the peak value V-peak and the bottom value V-bottom of the amplitude indicating signal RFAMP is given by $$\text{Vamp} = \text{Vpeak} - \text{Vbottom} = k\ p\ r\{1 - (m\ d/2)\} - k\ p\ r\ \{1 - (m/2)\} = k\ p\ r\ m - \{1 - d\}/2 \qquad (16).$$

On the other hand, the ratio Vquot between the peak value V-peak and the bottom value V-bottom of the amplitude indicating signal RFAMP, which is given by dividing the V-peak by V-bottom, is written as $$\text{Vquot} = \text{Vpeak/Vbottom} = [k\ p\ r\{1 - (m\ d/2)\}]/[k\ p\ r\{1 - (m/2)\}] = \{1 - (m - d/2)\}/\{1 - (m/2)\} = (2 - m\ d)/(2 - m) \qquad (17).$$

It can be understood by comparing equations (16) and (17) that since equation (16) includes all of the terms relating to the sensitivity and characteristic of the optical pickup 4, the quantity of the light beam 6, and reflectivity and modulation factor of the optical disc 1, etc., the Vamp given by equation (16) is more easily affected by changes in these terms than the Vquot given by equation (17) which only includes the terms m and d relating to the modulation factor of the optical disc 1. Thus, it is, preferred to combine the amplitude indicating signal generating section 10 of the fourth embodiment with the disc type identifying section 11 of the second embodiment or third embodiment, which divides the peak value V-peak of the amplitude indicating signal RFAMP by the bottom value V-bottom.

Embodiment 5

Figure 15:
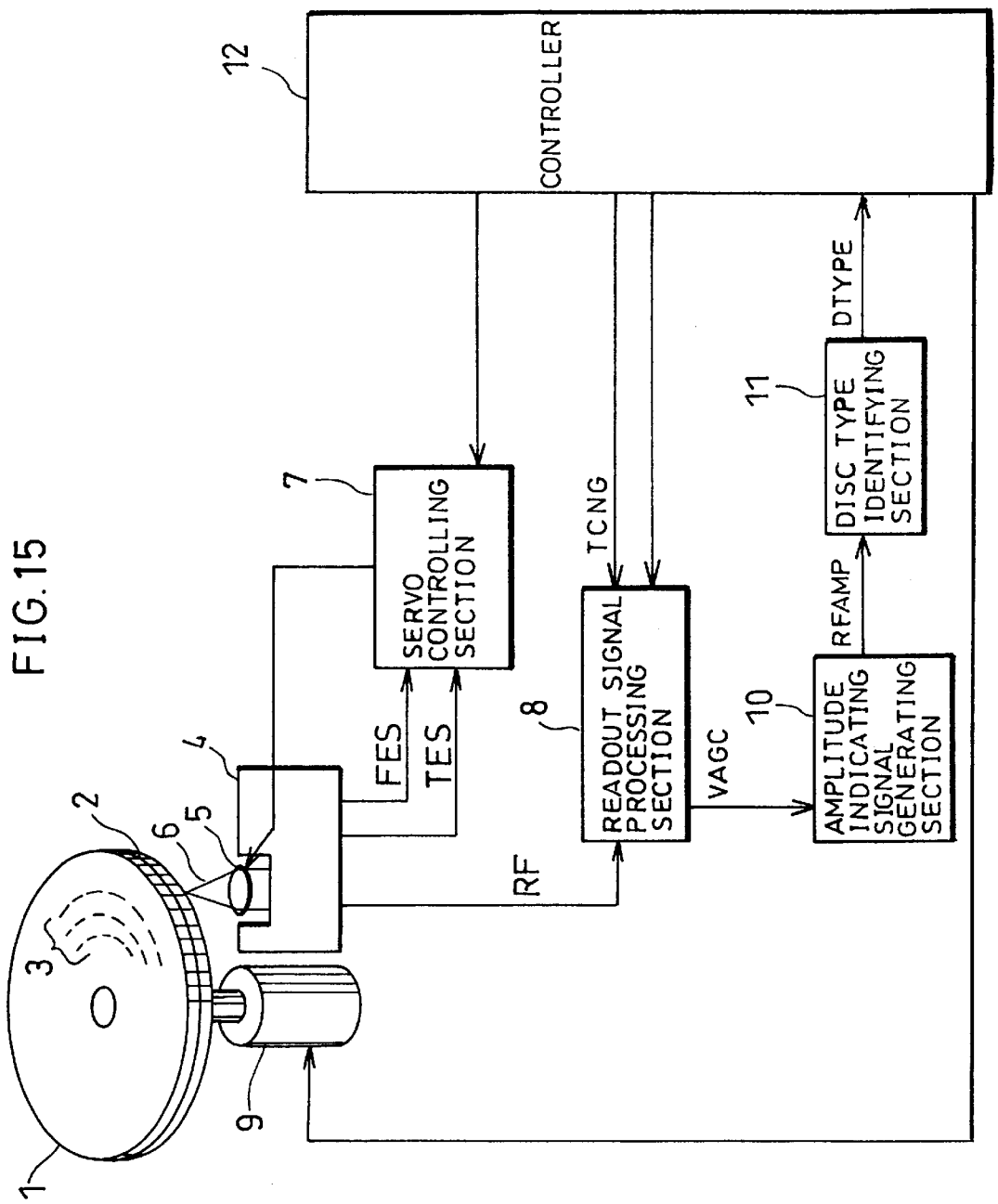
FIG. 15 is a block diagram showing a still another structure of the amplitude indicating signal generating section.

The fifth embodiment: further modifies the structure of the amplitude indicating signal generating section 10. FIG. 15 is a block diagram of an optical disc device of the fifth embodiment. As for the components explained in the first to fourth embodiments, the same numerals as those used in the previous embodiments are given, and explanations thereof are omitted here.

Figure 11:
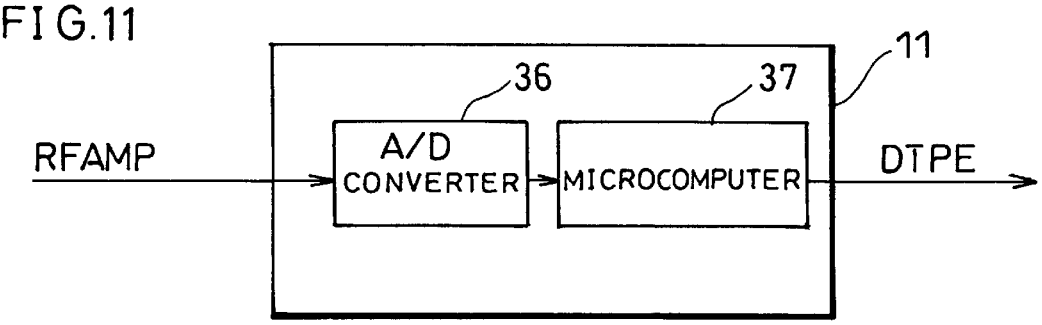
FIG. 11 is a block diagram showing still another structure of the disc type identifying section.

The fifth embodiment is explained by supposing that the disc type identifying section 11 shown in FIG. 15 has the structure explained in FIG. 11 of the third embodiment. However, this disc type identifying section 11 can have any of the structures described in the first to third embodiments.

As to be described later, the only differences between FIG. 15 and other embodiments are that a control signal VAGC is newly applied to the amplitude signal indicating section 10 from the readout signal processing section 8, and a response switching control signal TONG is newly applied to the readout signal processing section 8 from the controller 12.

As explained in the first embodiment with reference to FIG. 1, the readout signal processing section 8 performs automatic gain control (AGC) for adjusting the amplitude of the readout signal RF to a predetermined value, and reproducing the recorded information by demodulating the readout signal RF.

It is known that the automatic gain control (AGC) amplifies the input readout signal RF by introducing a small gain when the amplitude of the RF is large or amplifies the input readout signal RF by introducing large gain when the amplitude thereof is small, and outputs the resultant signal to the subsequent processing circuit. In short, the automatic gain control detects the amplitude of the RF, and uses a signal corresponding to the amplitude for the internal gain control. Therefore, if this signal is observed when the light beam is moving across the information tracks, the signal should vary according to changes in the amplitude of the RF during the movement of the light beam across the information tracks. Therefore, the types of optical discs having different track pitches should be distinguished from each other based on the degree of the changes in the amplitude.

Namely, in FIG. 15, the signal applied to the amplitude indicating signal generating section 10 is not the readout signal RF, but is the signal for controlling the gain in the readout signal processing section 8, i.e., the AGC control signal VAGC.

Figure 16:
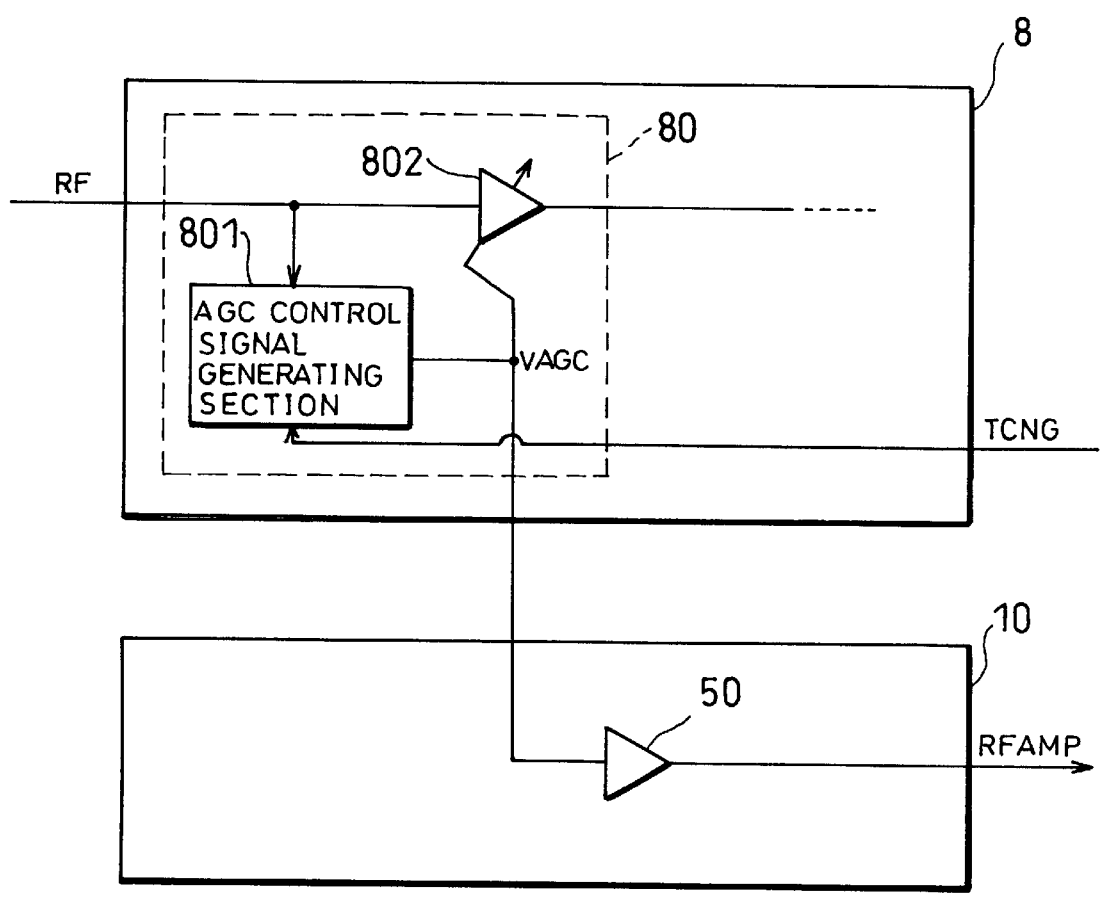
FIG. 16 is a circuit diagram showing still another structure of a readout signal processing section and amplitude indicating signal generating section.

FIG. 16 shows the structures of the readout processing section 8 and the amplitude indicating signal generating section 10. However, in FIG. 16, only the portions of the readout signal processing section 8, which are necessary to explain the relationship with the amplitude indicating signal generating section 10, are illustrated. In the readout signal processing section 8, an AGC section 80 for performing AGC control on the input readout signal RF is formed by an AGC control signal generating section 801, and a variable gain amplifier 802 for varying the degree of the amplification of the input signal RF according to the value of the AGC control signal. The AGC control signal generating section 801 generates an AGC control signal VAGC of high level when the amplitude of the input readout signal RF is large, or generates an AGC control signal VAGC of low level when the amplitude of the input readout signal RF is small. Moreover, the variable gain amplifier 802 introduces low amplification gain when the level of the VAGC is high, or high amplification gain when the level of the VAGC is low.

Furthermore, the AGC control signal generating section 801 is supplied with the response switching control signal TCNG from the controller 12 as will be described later.

Meanwhile, the amplitude indicating signal generating section 10 only includes an amplifier 50, and amplifies the AGC control signal VAGC from the readout signal processing section 8 by using the amplifier 50 and outputs the resultant signal as the amplitude indicating signal *RFAMP. The amplifier 50 introduces any gain. As an extreme example, if the gain is set at 1, it is possible to remove the amplifier 50 and use the VAGC as the RFAMP.

Figure 17A:
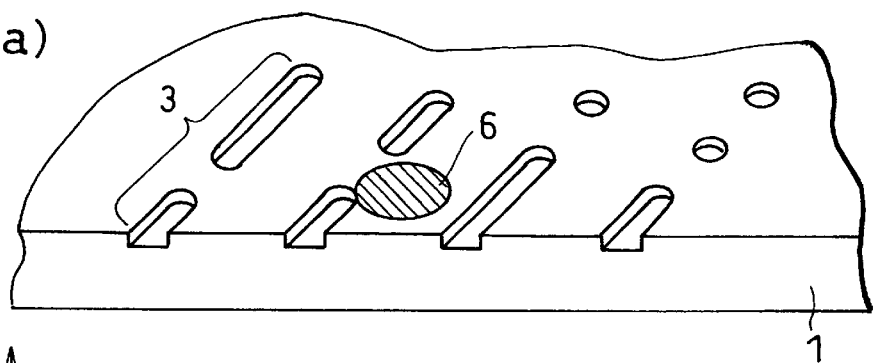
FIG. 17(a) is a perspective view showing a state in which the light beam is moved across the information track.
Figure 17B:
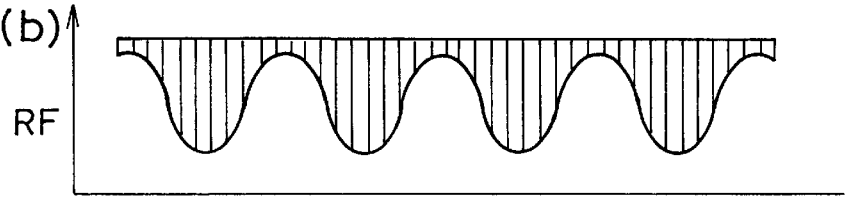
FIGS. 17(b) and 17(c) are waveform illustrations showing the readout signal and AGC control signal at a given time, respectively.
Figure 17C:
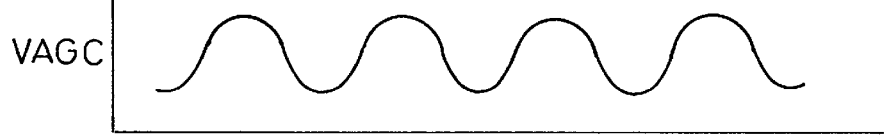

FIG. 17(c) illustrates changes in the AGC control signal VAGC which is output from the readout signal processing section of the fifth embodiment when the light beam 6 is moved across the information tracks 3. FIG. 17(a) shows the relative positional relationship between the light beam 6 and information track 3. FIG. 17(b) shows changes in the AGC control signal VAGC.

As described in the above explanation of the AGC section 80, the VAGC increases or decreases according to the changes in the amplitude of the RF. Therefore, if the VAGC is amplified according to a need and is used as the amplitude indicating signal RFAMP, it is possible to distinguish optical discs having different track pitches by the application of the means and method explained in the first to forth embodiments.

In general, the AGC processing absorbs the changes in the amplitude of the readout signal RF due to the rotation of the optical disc, adjusts the amplitude of the readout signal RF to a constant amplitude, and then supplies the readout signal RF to the subsequent circuit. Therefore, the response speed of the AGC processing is usually set at a value about several times that of the rotation frequency of the optical disc so that the AGC processing does not respond to scratches or the like on the optical disc. However, with such a slow response speed, the VAGC does not follow the changes in the amplitude of the RF which occur when the light beam 6 crosses the information tracks 3. Therefore, the response switching control signal TONG is applied from the controller 12 to the AGC control signal generating section 801 of this embodiment so as to switch the response speed to a quicker response speed during a period in which the light beam 6 crosses the information tracks 3 to identify the type of the optical disc.

There is a possibility that the level of the readout signal RF and the level of the AGC control signal VAGC have inverse relation depending on the type of the AGC section 80. However, the present invention does not suffer from any problems because it identifies the type of an optical disc based only on the difference between the peak value and bottom value of the amplitude indicating signal RFAMP or the ratio between the peak value and bottom value thereof.

According to the structure of the fifth embodiment, the AGC control signal is used as the amplitude indicating signal of the readout signal RF in the automatic gain control (AGC) function which is usually provided in the readout signal processing section 8 for processing the readout signal RF in the optical disc device. Consequently, the structure of the amplitude indicating signal generating section 10 is simplified, thereby As explained in this embodiment, the amplitude indicating signal of the present invention needs to be a signal which varies according to a change in the amplitude of the readout signal, more specifically a signal which varies according to a change in the total quantity of reflected light received by the optical pickup. Namely, the amplitude indicating signal of the present invention is not necessarily limited to the signal explained in the above-mentioned embodiments(the signal produced by detecting the amplitude of the readout signal, i.e., AGC control signal).

Embodiment 6

Referring to FIGS. 18 to 21, the following description will explain the sixth embodiment.

As explained in the first embodiment with reference to FIG. 1, the axis of rotation of the optical disc 1 and the center of concentric or spiral information tracks 3 do not usually coincide with each other. Therefore, even if the position of the light beam 6 is fixed, the light beam 6 is displaced relatively to the information track 3 with a rotation of the optical disc 1, and crosses the information track 3. Accordingly, the amplitude of the readout signal RF and the amplitude indicating signal RFAMP vary. These phenomena are in fact observed in almost all cases, and the respective means described in the above-mentioned embodiments operate so as to achieve the object of the present invention in accordance with that fact.

It happens, though it is very rare, that the deviation between the axis of rotation of the optical disc 1 and the center of concentric or spiral information tracks 3 (i.e., a so-called eccentricity of the optical disc 1) is very small due to the mounting condition of the optical disc 1 to the spindle motor 9, and it takes a relatively long time for the light beam 6 to cross the information tracks 3 even when the optical disc 1 rotates (for example, there may be a case that the light beam 6 takes a time between several tens of ms and several hundred ms depending on the rotation speed of the optical disc). In this case, the amplitude of the readout signal RF and the amplitude indicating signal RFAMP take a long time to show their changes. Consequently, it is necessary to observe the RFAMP for a long time to identify the type of the optical disc 1. Thus, there is a possibility that the starting time of the optical disc device increases.

Alternatively, there is a possibility that the lens 5 for converging the light beam 6 is vibrated due to disturbance, vibration of the device, etc., and the relative speed of the light beam 6 and the information track 3 become nearly zero accidentally depending on the vibrating direction and speed. In this case, for the same reason as mentioned above, there is a possibility that the starting time of the optical disc device increases.

In the sixth embodiment, since the lens 5 is driven in a radial direction of the optical disc 1 when identifying the type of the optical disc 1, even when the eccentricity of the optical disc 1 is extremely small or even when the lens 5 is vibrated due to disturbance, the light beam 6 is arranged to certainly cross the information track 3.

FIG. 18 shows a block diagram of the optical disc device of this embodiment. The block diagram is basically the same as that of the first embodiment shown in FIG. 1. Besides, although the disc type identifying section 11 may have any of the above-mentioned structures, it is assumed in the sixth embodiment that the disc type identifying section 11 has the structure explained in the third embodiment shown in FIG. 11.

The significant difference between the structure of FIG. 18 and other embodiments is that a lens drive signal LMOVE is input to the servo control section 7 from the controller 12. The following description will, explain an optical disc device having the structure shown in FIG. 18.

However, the explanations for the same structures as those of the first to fifth embodiments will be omitted here.

In this optical disc device, when identifying the type of the optical disc 1, the controller 12 outputs the signal LMOVE, and the servo control section 7 drives the lens 5 in a radial direction of the optical disc 1 according to the LMOVE (identification drive means). Therefore, even when the eccentricity of the optical disc 1 is very small or when the lens 5 vibrates due to disturbance, the light beam 6 is quickly and certainly moved across the information tracks 3. Consequently, the amplitude of the readout signal RF and the amplitude indicating signal RFAMP certainly vary quickly. It is thus possible to identify the type of the optical disc 1 in a short time, and prevent an unnecessary increase in the starting time of the optical disc device.

It is not necessarily that the controller 12 outputs a uniform signal LMOVE. For example, the controller 12 may increase the level of the signal LMOVE gradually while observing the tracking error signal TES or the amplitude indicating signal RFAMP, and then the servo control section 7 may increase the amount by which the lens 5 is driven according to the increase in the level of the LMOVE so that outputting the signal LMOVE, i.e., driving the lens 5, is stopped at the time the light beam 6 crosses a minimum number of the information tracks 3 required for identifying the type of the optical disc 1. In this case, the movement of the lens 5 is limited to such an amount that the light beam 6 is moved across the minimum number of the information tracks 3 to identify the type of the optical disc 1. Therefore, the displacement of the lens 5 from the original center position is limited to a small value, and the tracking servo control (pulling the servo) is smoothly started after the identifying process, thereby producing a further advantage.

Next, the following description will explain a case where the lens 5 is moved not only in one direction along a radial direction of the optical disc 1, but also in both directions.

Figure 19A:
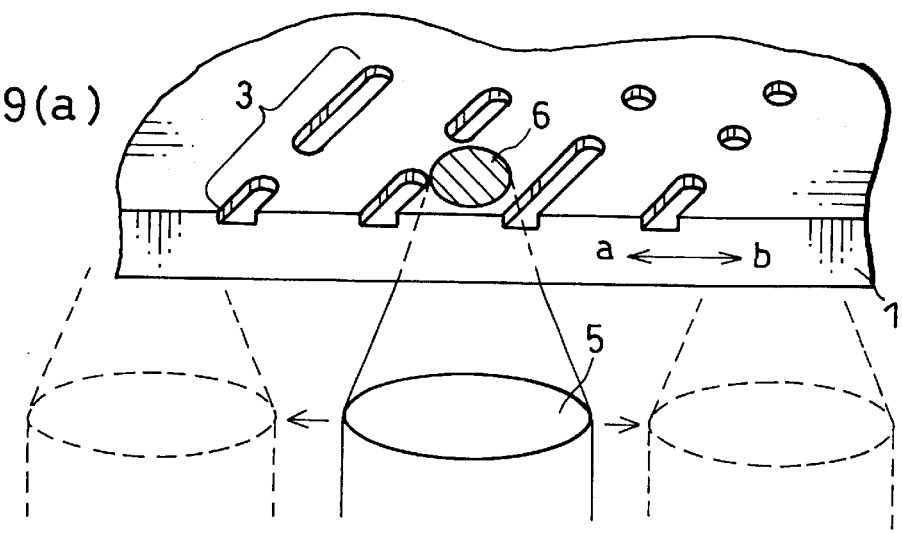
FIG. 19(a) is a perspective view showing a state in which a lens is driven in a radial direction of an optical disc.
Figure 19B:
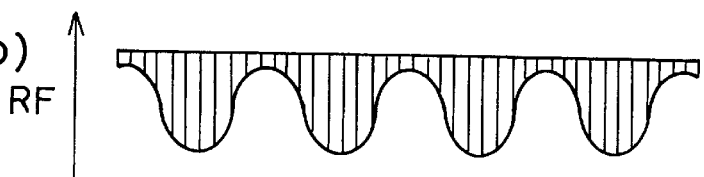
FIG. 19(b) is a waveform illustration showing changes in the readout signal when the lens is driven.

FIG. 19(b) shows changes in the readout signal RF, which are caused by the movement of the light beam 6 across the information tracks 3 when the lens 5 is moved in a radial direction of the optical disc 1. FIG. 19(a) shows the relationship between the relative positions of the light beam 6 and information track 3. Moreover, FIG. 19(b) shows changes in the readout signal RF corresponding to FIG. 19(a).

In FIG. 19(a), suppose that the lens 5 is moved in a radial direction (either of directions a and b) of the optical disc 1, for example, in the direction a shown in FIG. 19(a). In this case, if the eccentricity of the optical disc 1 is very small, even when the lens 5 is driven in either of the directions a or b, the relative speed of the light beam 6 to the information track 3 is increased. Thus, since the light beam 6 certainly crosses the information tracks 3, it is possible to quickly identify the type of the optical disc 1 using the technique of the present invention described in the above-mentioned embodiments.

However, if the eccentricity of the optical disc 1 is large, when the optical disc 1 rotates, the information tracks 3 move in both of the directions a and b with respect to the light beam 6. Suppose that, when the lens 5 is driven in the direction a, the information track 3 is moved in the same direction, and the relative speed of the light beam 6 and the information track 3 is lowered. As a result, it takes a longer time for the light beam 6 to cross the information tracks 3, and a longer time to identify the type of the optical disc 1.

However, if the signal LMOVE as a signal varying in the positive and negative directions is applied to the servo control section 7 and the lens 5 is driven in both of the directions a and b, even when the eccentricity of the optical disc 1 is large, one of the directions is a direction for increasing the relative speed of the light beam 6 and the information track 3. Hence, it is possible to move the light beam 6 to cross the information tracks 3 more certainly than driving the lens 5 in one of the directions, irrespective of the degree of the eccentricity of the optical disc 1. Consequently, it is possible to certainly and quickly identify the type of the optical disc 1, thereby producing a further advantage.

Figure 20A:
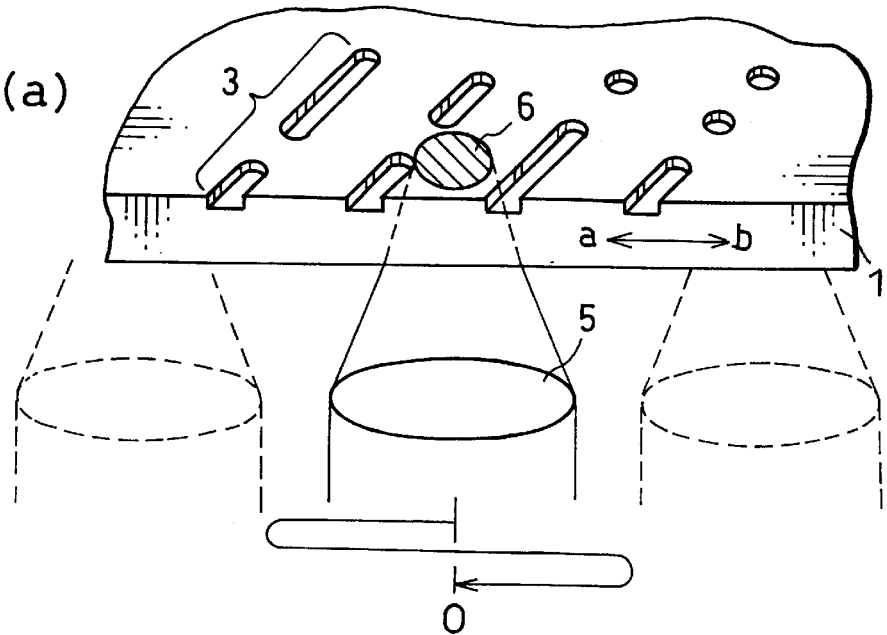
FIG. 20(a) is a perspective view showing a state in which a lens is driven in a radial direction of an optical disc.
Figure 20B:
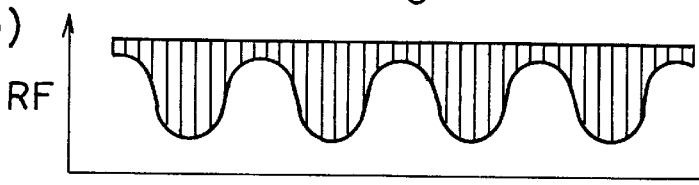
FIG. 20(b) is a waveform illustration showing changes in the readout signal when the lens is driven.

Furthermore, it is considered to drive the lens 5 in both directions along a radial direction of the optical disc 1 for a uniform time with a uniform amplitude. More specifically, it is preferred to drive the signal LMOVE with the use of a signal which varies in the positive and negative directions to have the same peak-to-peak value and the same time interval. In this case, as illustrated in FIG. 20(*a*), after the signal LMOVE is output, since the lens 5 returns to the original position, i.e., the neutral zero point, there is a further advantage that the tracking servo control is smoothly started after identifying the type of the optical disc 1. FIG. 20(*a*) shows the relative positional relationship between the light beam 6 and the information track 3, and FIG. 20(*b*) shows changes in the readout signal RF.

Moreover, even when the lens 5 is simply stopped after driving the lens 5 in either of the directions along a radial direction of the optical disc 1, the same effects as those obtained when the lens 5 is driven in both directions along a radial direction of the optical disc 1 can be obtained depending on the mechanical structure for supporting the lens 5. The effects will be explained in detail below.

FIG. 21(*a*) shows the relative positional relationship between the light beam 6 and the information track 3. FIG. 21(*b*) shows changes in the readout signal RF. As illustrated in FIGS. 21(*a*) and 21(*b*), the lens supporting mechanism of the optical pickup 4 supports the lens 5 at the neutral zero point in a tracking direction (a radial direction of the optical disc 1) by springs 501. In this structure, when the lens 5 is once driven in the direction a by the signal LMOVE and is then stopped, the lens 5 returns to the original neutral zero point by the returning force of the springs 501 (returning means). The moving direction of the light beam 6 with respect to the information track 3 is switched in the process of driving the lens 5 in the direction a and in the process of moving the lens 5 back to the zero point. With this structure, since the light beam 6 surely crosses the information tracks 3, it is possible to quickly identify the type of the optical disc 1 and simplify the signal for driving the lens 5.

(i) An optical disc device of the present invention is an optical disc device for reproducing information recorded on an information track of an optical disc by using an optical pickup for applying a light beam to the information-recorded side of the optical disc and for receiving light reflected from the information-recorded side, and includes identifying means for identifying the type of the optical disc based on a change in the amplitude of a signal varying according to the total quantity of the reflected light received by the optical pickup when the light beam is displaced relatively to the information track in a radial direction of the optical disc.

(ii) Another optical disc device of the present invention is an optical disc device for reproducing information recorded on an information track of an optical disc as a readout signal by using an optical pickup for applying a light beam to the information-recorded side of the optical disc and for receiving light reflected from the information-recorded side, and includes identifying means for identifying type of the optical disc based on an amplitude indicating signal which varies according to a change in the amplitude of the readout signal when the light beam is displaced relatively to the information track in a radial direction of the optical disc.

With the optical disc device (i) or (ii), it is possible to identify the types of optical discs having different information recording densities at an early stage, and significantly shorten the starting time of the optical disc device using these different types of optical discs.

(iii) An optical disc device based on the optical disc device of (ii), wherein the identifying means includes amplitude indicating signal generating means for generating the amplitude indicating signal, and difference comparing means for comparing the difference between the maximum value and minimum value of the amplitude indicating signal with a predetermined value. With this structure, it is possible to easily identify the types of optical discs.

(iv) An optical disc device based on the optical disc device of (ii), wherein the identifying means includes amplitude indicating signal generating means for generating the amplitude indicating signal, and ratio comparing means for comparing the ratio between the maximum value and minimum value of the amplitude indicating signal with a predetermined value. With this structure, since the type of an optical disc is identified based on the ratio between the maximum value and minimum value of a signal (amplitude indicating signal) for identifying the type of an optical disc, it is possible to more accurately identify the type of the optical disc by reducing the influences of the reflectivity of the optical disc, the sensitivity of the optical pickup, the variation in the quantity of the light beam applied to the optical disc, etc.

(v) An optical disc device based on the optical disc device of (iv), wherein the ratio is obtained by dividing the maximum value of the amplitude indicating signal by the minimum value thereof. With this structure, since the type of optical disc is identified based on the ratio calculated by dividing the maximum value of the amplitude indicating signal by the minimum value, it is possible to detect variations in the track pitch with higher sensitivity and more accurately identify the type of the optical disc.

(vi) An optical disc device based on any of the optical disc devices of (ii) to (v), wherein the amplitude indicating signal generating means includes envelope detecting means for detecting an envelope of the readout signal, and generates an amplitude indicating signal based on the envelope. With this structure, since a signal (amplitude indicating signal) for identifying the type of an optical disc is a signal generated based on the envelope of the readout signal, even if a signal after AC coupling without retaining the direct current component of the readout signal is used, it is possible to accurately generate the amplitude indicating signal, thereby increasing flexibility in designing the processing circuit of the readout signal.

(vii) An optical disc device based on any of the optical disc devices of (ii) to (v), wherein the amplitude indicating signal generating means includes mean value detecting means for detecting a mean value of the readout signal, and generates the amplitude indicating signal based on the mean value. With this structure, since a signal (amplitude indicating signal) for identifying the type of an optical disc is a signal generated based on the mean value of the readout signal, it is possible to simplify the circuit for generating the amplitude indicating signal.

(viii) An optical disc device based on any of the optical disc devices of (i) to (vii), wherein the identifying means identifies the type of an optical disc while stopping the light beam at a position. With this structure, when identifying the type of the optical disc, the position of the light beam is fixed, and the displacement of the relative position of the light beam and the information track due to the eccentricity of the optical disc is used. It is thus possible to identify the type of the optical disc without performing a special displacement operation, and simplify the structure.

(ix) An optical disc device based on any of the optical disc devices of (i) to (vii), wherein the identifying means includes identification drive means for driving the light beam so as to displace the information track of the optical disc and the light beam relatively. With this structure, since the light beam is driven so that the information track and the light beam are displaced relative to each other in identifying an optical disc, even when an optical disc of an extremely small eccentricity is loaded, the light beam certainly crosses the information tracks, thereby identifying the type of the optical disc within a short time.

(x) An optical disc device based on the optical disc device of (ix), wherein the identification drive means gradually increases the amount by which the light beam is driven. With this structure, since the amount by which the light beam is driven is gradually increased according to a need when identifying the type of the optical disc, it is possible to smoothly start the tracking servo control after identifying the type of the optical disc.

(xi) An optical disc device based on the optical disc device of (ix), wherein the identification drive means drives the light beam in both directions along a radial direction of the optical disc. With this structure, since the light beam is driven in both directions along a radial direction of the optical disc when identifying the type of the optical disc, the light beam certainly crosses the information tracks irrespective of the degree of the eccentricity of the optical disc, thereby identifying the type of the optical disc within a short time.

(xii) An optical disc device based on the optical disc device of (xi), wherein the identification drive means drives the light beam in both directions along a radial direction of the optical disc for a uniform time with a uniform amplitude. With this structure, since the light beam is driven in both directions along a radial direction of the optical disc for a uniform time with a uniform amplitude in identifying the type of the optical disc, the light beam returns to the original neutral position after identifying the type of the optical disc. As a result, the tracking servo control can be smoothly started.

(xiii) An optical disc device based on the optical disc device of (xi), wherein the optical pickup includes returning means for returning the position of the light beam to the neutral position after driving, and the light beam is driven in both directions along a radial direction of the optical disc by driving the light beam in either of the directions along a radial direction of the optical disc by the identification drive means and then returning the light beam by the returning means. With this structure, since a structure capable of returning the light beam to the neutral position is used as the optical pickup, the light beam is displaced relatively to the information track in both directions along a radial direction of the optical disc by simply diving the light beam in either of the directions along a radial direction of the optical disc and then stopping the driving of the light beam in identifying the type of the optical disc, thereby simplifying the signal for driving the light beam.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disc device for reproducing information recorded on an information track of an optical disc, comprising:

a pickup for applying a light beam to an information-recorded side of the optical disc, receiving light reflected from the information-recorded side, and outputting a readout signal based on a quantity of the light received;

amplitude indicating signal generating means for generating an amplitude indicating signal varying according to a change in an amplitude of the readout signal which occurs when the light beam is displaced relative to the information track in a radial direction of the optical disc, based on the readout signal representing the quantity of one light beam reflected from the information tracks; and identifying means for identifing a type of the optical disc based on a density of the information tracks in a radial direction of the optical disc by comparing a difference between a maximum value and a minimum value of the amplitude indicating signal with a predetermined value.

2. The optical disc device as set forth in claim 1, wherein said identifying means identifies the type of the optical disc in a state in which the light beam is stopped at a position without being driven in a radial direction of the optical disc.

3. The optical disc device as set forth in claim 1, wherein said identifying means includes identification drive means for driving the light beam so that the information track and the light beam are displaced relatively in a radial direction of the optical disc.

4. The optical disc device as set forth in claim 3, wherein said identification drive means increases gradually an amount by which the light beam is driven.

5. The optical disc device as set forth in claim 3, wherein said identification drive means drives the light beam in both directions along a radial direction of the optical disc.

6. The optical disc device as set forth in claim 5, wherein said identification drive means drives the light beam in both directions along a radial direction of the optical disc for a uniform time with a uniform amplitude.

7. The optical disc device as set forth in claim 5, wherein said identification drive means drives the light beam in either of the directions along a radial direction of the optical disc, and said pickup includes returning means for returning the light beam to a neutral position after being driven.

8. The optical disc device as set forth in claim 1, wherein said amplitude indicating signal generating means includes envelope detecting means for detecting an envelope of the readout signal, and generates the amplitude indicating signal based on the envelope.

9. The optical disc device as set forth in claim 8, wherein said identifying means identifies the type of the optical disc in a state in which the light beam is stopped at a position without being driven in a radial direction of the optical disc.

10. The optical disc device as set forth in claim 8,
wherein said identifying means includes identification drive means for driving the light beam so that the information track and the light beam are displaced relatively in a radial direction of the optical disc.

11. The optical disc device as set forth in claim 1,
wherein said amplitude indicating signal generating means includes mean value detecting means for detecting a mean value of the readout signal, and generates the amplitude indicating signal based on the mean value.

12. The optical disc device as set forth in claim 11,
wherein said identifying means identifies the type of the optical disc in a state in which the light beam is stopped at a position without being driven in a radial direction of the optical disc.

13. The optical disc device as set forth in claim 11,
wherein said identifying means includes identification drive means for driving the light beam so that the information track and the light beam are displaced relatively in a radial direction of the optical disc.

14. The optical disc device as set forth in claim 1, further comprising automatic gain control signal generating means for generating an automatic gain control signal which controls gain of a variable gain amplifier for adjusting the amplitude of the readout signal to a uniform amplitude by absorbing a change in the amplitude due to rotation of the optical disc,
wherein said amplitude indicating signal generating means includes an amplifier for amplifying the automatic gain control signal.

15. The optical disc device as set forth in claim 14, further comprising response control means for controlling a response speed of said automatic gain control signal generating means to be higher than a normal speed when identifying the type of the optical disc.

16. An optical disc device for reproducing information recorded on an information track of an optical disc, comprising:
a pickup for applying a light beam to an information-recorded side of the optical disc, receiving light reflected from the information-recorded side, and outputting a readout signal based on a quantity of light received;
amplitude indicating signal generating means for generating an amplitude indicating signal varying according to a change in an amplitude of the readout signal which occurs when the light beam is displaced relative to the information track in a radial direction of the optical disc, based on the readout signal representing the quantity of one light beam reflected from the information tracks; and
identifying means for identifying a type of the optical disc based on a density of the information tracks in a radial direction of the optical disc by comparing a ratio between a maximum and a minimum value of the amplitude indicating signal with a predetermined value.

17. The optical disc device as set forth in claim 16,
wherein said identifying means identifies the type of the optical disc in a state in which the light beam is stopped at a position without being driven in a radial direction of the optical disc.

18. The optical disc device as set forth in claim 16,
wherein said identifying means includes identification drive means for driving the light beam so that the information track and the light beam are displaced relatively in a radial direction of the optical disc.

19. The optical disc device as set forth in claim 18,
wherein said identification drive means increases gradually an amount by which the light beam is driven.

20. The optical disc device as set forth in claim 18,
wherein said identification drive means drives the light beam in both directions along a radial direction of the optical disc.

21. The optical disc device as set forth in claim 20,
wherein said identification drive means drives the light beam in both directions along a radial direction of the optical disc for a uniform time with a uniform amplitude.

22. The optical disc device as set forth in claim 20,
wherein said identification drive means drives the light beam in either of the directions along a radial direction of the optical disc, and
said pickup includes returning means for returning the light beam to a neutral position after being driven.

23. The optical disc device as set forth in claim 16,
wherein said identifying means includes divider means for calculating the ratio by dividing the maximum value of the amplitude indicating signal by the minimum value.

24. The optical disc device as set forth in claim 23,
wherein said amplitude indicating signal generating means includes envelope detecting means for detecting an envelope of the readout signal, and generates the amplitude indicating signal based on the envelope.

25. The optical disc device as set forth in claim 23,
wherein said amplitude indicating signal generating means includes mean value detecting means for detecting a mean value of the readout signal, and generates the amplitude indicating signal based on the mean value.

26. The optical disc device as set forth in claim 23,
wherein said identifying means identifies the type of the optical disc in a state in which the light beam is stopped at a position without being driven in a radial direction of the optical disc.

27. The optical disc device as set forth in claim 23,
wherein said identifying means includes identification drive means for driving the light beam so that the information track and the light beam are displaced relatively in a radial direction of the optical disc.

28. The optical disc device as set forth in claim 16,
wherein said amplitude indicating signal generating means includes envelope detecting means for detecting an envelope of the readout signal, and generates the amplitude indicating signal based on the envelope.

29. The optical disc device as set forth in claim 28,
wherein said identifying means identifies the type of the optical disc in a state in which the light beam is stopped at a position without being driven in a radial direction of the optical disc.

30. The optical disc device as set forth in claim 28,
wherein said identifying means includes identification drive means for driving the light beam so that the information track and the light beam are displaced relatively in a radial direction of the optical disc.

31. The optical disc device as set forth in claim 16,
wherein said amplitude indicating signal generating means includes mean value detecting means for detecting a mean value of the readout signal, and generates the amplitude indicating signal based on the mean value.

32. The optical disc device as set forth in claim 31, wherein said identifying means identifies the type of the optical disc in a state in which the light beam is stopped at a position without being driven in a radial direction of the optical disc.

33. The optical disc device as set forth in claim 31, wherein said identifying means includes identification drive means for driving the light beam so that the information track and the light beam are displaced relatively in a radial direction of the optical disc.

34. The optical disc device as set forth in claim 16, wherein said identifying means includes:
- an A/D converter for converting the amplitude indicating signal into digital data; and
- a microcomputer for extracting a maximum value and a minimum value from the digital data output from said A/D converter, calculating the ratio by dividing the maximum value by the minimum value, and comparing the ratio with a predetermined value.

35. The optical disc device as set forth in claim 34, wherein said amplitude indicating signal generating means includes envelope detecting means for detecting an envelope of the readout signal, and generates the amplitude indicating signal based on the envelope.

36. The optical disc device as set forth in claim 34, wherein said amplitude indicating signal generating means includes mean value detecting means for detecting a mean value of the readout signal, and generates the amplitude indicating signal based on the mean value.

37. The optical disc device as set forth in claim 34, wherein said identifying means identifies the type of the optical disc in a state in which the light beam is stopped at a position without being driven in a radial direction of the optical disc.

38. The optical disc device as set forth in claim 34, wherein said identifying means includes identification drive means for driving the light beam so that the information track and the light beam are displaced relatively in a radial direction of the optical disc.

39. The optical disc device as set forth in claim 16, further comprising automatic gain control signal generating means for generating an automatic gain control signal which controls gain of a variable gain amplifier for adjusting the amplitude of the readout signal to a uniform amplitude by absorbing a change in the amplitude due to a rotation of the optical disc,
wherein said amplitude indicating signal generating means includes an amplifier for amplifying the automatic gain control signal.

40. The optical disc device as set forth in claim 39, further comprising response control means for controlling a response speed of said automatic gain control signal generating means to be higher than a normal speed when identifying the type of the optical disc.

\* \* \* \* \*